(12) United States Patent
Yanagi

(10) Patent No.: US 10,310,782 B2
(45) Date of Patent: Jun. 4, 2019

(54) IMAGE FORMING APPARATUS HAVING A SCANNER, INFORMATION PROCESSING SYSTEM HAVING THE SAME, AND INFORMATION PROCESSING METHOD USING THE SAME

(71) Applicant: Hideki Yanagi, Kanagawa (JP)

(72) Inventor: Hideki Yanagi, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/480,580

(22) Filed: Apr. 6, 2017

(65) Prior Publication Data

US 2017/0308337 A1 Oct. 26, 2017

(30) Foreign Application Priority Data

Apr. 20, 2016 (JP) ................................ 2016-084792
Jan. 25, 2017 (JP) ................................ 2017-011490

(51) Int. Cl.

| H04N 1/00 | (2006.01) |
|---|---|
| H04W 76/20 | (2018.01) |
| H04W 76/00 | (2018.01) |
| G06F 3/12 | (2006.01) |
| H04N 1/44 | (2006.01) |
| H04L 29/08 | (2006.01) |

(52) U.S. Cl.
CPC .......... *G06F 3/1236* (2013.01); *G06F 3/1203* (2013.01); *G06F 3/1285* (2013.01); *H04N 1/00244* (2013.01); *H04N 1/4413* (2013.01); *G06F 3/1222* (2013.01); *G06F 3/1238* (2013.01); *H04L 67/146* (2013.01); *H04N 2201/0094* (2013.01)

(58) Field of Classification Search
USPC ................................................. 358/1.1–3.29
See application file for complete search history.

(56) References Cited

U.S. PATENT DOCUMENTS

| 8,520,229 B2 | 8/2013 | Kusakabe |
| 8,953,183 B2* | 2/2015 | Mizoguchi ............ G06F 3/1271 358/1.13 |
| 9,819,832 B2* | 11/2017 | Koizumi ............ H04N 1/00204 |
| 2005/0073716 A1* | 4/2005 | Maki ...................... G06Q 10/10 358/1.15 |

(Continued)

FOREIGN PATENT DOCUMENTS

| JP | 5264433 | 8/2013 |
| JP | 2015-207938 | 11/2015 |

*Primary Examiner* — Marcellus J Augustin
(74) *Attorney, Agent, or Firm* — IPUSA, PLLC

(57) ABSTRACT

An information processing apparatus having an image processing function is provided that includes a memory storing a program and a processor configured to execute the program to implement processes of accepting an input of server information for establishing connection with a server apparatus that is connected to the information processing apparatus via a network, determining whether the accepted server information is valid, generating connection destination information including the accepted server information that has been determined to be valid and registering the generated connection destination information, and transmitting a processing result of the image processing function to the server apparatus using the registered connection destination information.

16 Claims, 17 Drawing Sheets

(56) References Cited

U.S. PATENT DOCUMENTS

| | | |
|---|---|---|
| 2006/0282655 A1 | 12/2006 | Yanagi |
| 2007/0206219 A1 | 9/2007 | Yanagi |
| 2007/0234400 A1 | 10/2007 | Yanagi |
| 2008/0068644 A1 | 3/2008 | Yanagi |
| 2009/0157906 A1 | 6/2009 | Yanagi |
| 2012/0210415 A1* | 8/2012 | Somani ............... H04L 63/0884 726/9 |
| 2013/0301069 A1 | 11/2013 | Yanagi |
| 2014/0240761 A1* | 8/2014 | Nagai ................... G06F 3/1222 358/1.15 |
| 2015/0116764 A1* | 4/2015 | Mori ..................... G06F 3/1204 358/1.15 |
| 2016/0099833 A1* | 4/2016 | Fujisawa ................ H04L 67/02 709/221 |
| 2016/0134778 A1* | 5/2016 | Tanaka .................. H04N 1/217 358/1.16 |
| 2016/0170980 A1* | 6/2016 | Stadnisky ........... G06F 17/3007 726/7 |

\* cited by examiner

FIG.6
| URL | USER NAME | PASSWORD | SERVER NAME | ROOT FOLDER | ICON |
|---|---|---|---|---|---|
| http://abc.server1.co.jp | u001 | ***** | SERVER 1 | home |  |
| http://123.server1.co.jp | u002 | ***** | SERVER 2 | test |  |
| http://xyz.server2.co.jp | u003 | ***** | ○○ SERVER | root |  |
| | | ... | | | |

FIG.15
| ICON ID | ICON |
|---------|------|
| A001 | 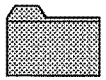 |
| A002 |  |
| A003 | 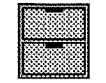 |
| ⋮ | |

FIG.16

| | SERVER INFORMATION | | | | | |
|---|---|---|---|---|---|---|
| URL | USER NAME | PASSWORD | SERVER NAME | ROOT FOLDER | ICON ID | |
| http://abc.server1.co.jp | u001 | ***** | SERVER 1 | home | A001 | |
| http://123.server1.co.jp | u002 | ***** | SERVER 2 | test | A002 | |
| http://xyz.server2.co.jp | u003 | ***** | ○○ SERVER | root | A001 | |
| ... | | | | | | 33 |

IMAGE FORMING APPARATUS HAVING A SCANNER, INFORMATION PROCESSING SYSTEM HAVING THE SAME, AND INFORMATION PROCESSING METHOD USING THE SAME

CROSS-REFERENCE TO RELATED APPLICATIONS

The present application claims priority under 35 U.S.C. § 119 to Japanese Patent Application No. 2016-084792 filed on Apr. 20, 2016 and Japanese Patent Application No. 2017-011490 filed on Jan. 25, 2017, the entire contents of which are incorporated herein by reference.

BACKGROUND OF THE INVENTION

1. Field of the Invention

The present invention relates to an information processing apparatus, an information processing system, and an information processing method.

2. Description of the Related Art

Techniques are known for enabling a user to select transmission destination information preregistered in an image forming apparatus, such as an MFP (Multifunction Peripheral), so that image data generated by performing a scanning operation can be stored in a server apparatus specified by the selected transmission destination information.

Also, techniques are known for preventing erroneous transmission by displaying the name of a PC (personal computer) corresponding to a transmission destination as well as the name of a user that has logged into the PC on an image forming apparatus (see e.g., Japanese Patent No. 5264433).

However, for example, when a URL (Uniform Resource Locator) or an address of a server apparatus specified by the transmission destination information is incorrect, image data generated by a scanning operation cannot be transmitted to the server apparatus. Also, in a case where the server apparatus requires authentication, if authentication information, such as a user name and a password, included in the transmission destination information is incorrect, the image data cannot be stored in the server apparatus.

Because transmission destination information is typically registered by a special user such as an administrator of the image forming apparatus, even when information, such as a URL, a user name, or a password, is incorrect, a general user may not be able to correct the information.

Thus, techniques are desired for ensuring that a user such as an administrator of the image forming apparatus registers valid transmission destination information including, a correct URL, a correct user name, and a correct password, for example.

SUMMARY OF THE INVENTION

An aspect of the present invention is directed to providing a technique for registering valid connection destination information.

According to one embodiment of the present invention, an information processing apparatus having an image processing function is provided that includes a memory storing a program and a processor configured to execute the program to implement processes of accepting an input of server information for establishing connection with a server apparatus that is connected to the information processing apparatus via a network, determining whether the accepted server information is valid, generating connection destination information including the accepted server information that has been determined to be valid and registering the generated connection destination information, and transmitting a processing result of the image processing function to the server apparatus using the registered connection destination information.

BRIEF DESCRIPTION OF THE DRAWINGS

FIG. 6 is a diagram illustrating an example of transmission destination information;

FIG. 15 is a diagram illustrating an example of fixed information;

FIG. 16 is a diagram illustrating an example of variable information; and

DESCRIPTION OF THE EMBODIMENTS

In the following, embodiments of the present invention are described with reference to the accompanying drawings.

First Embodiment

<System Configuration>

Figure 1:
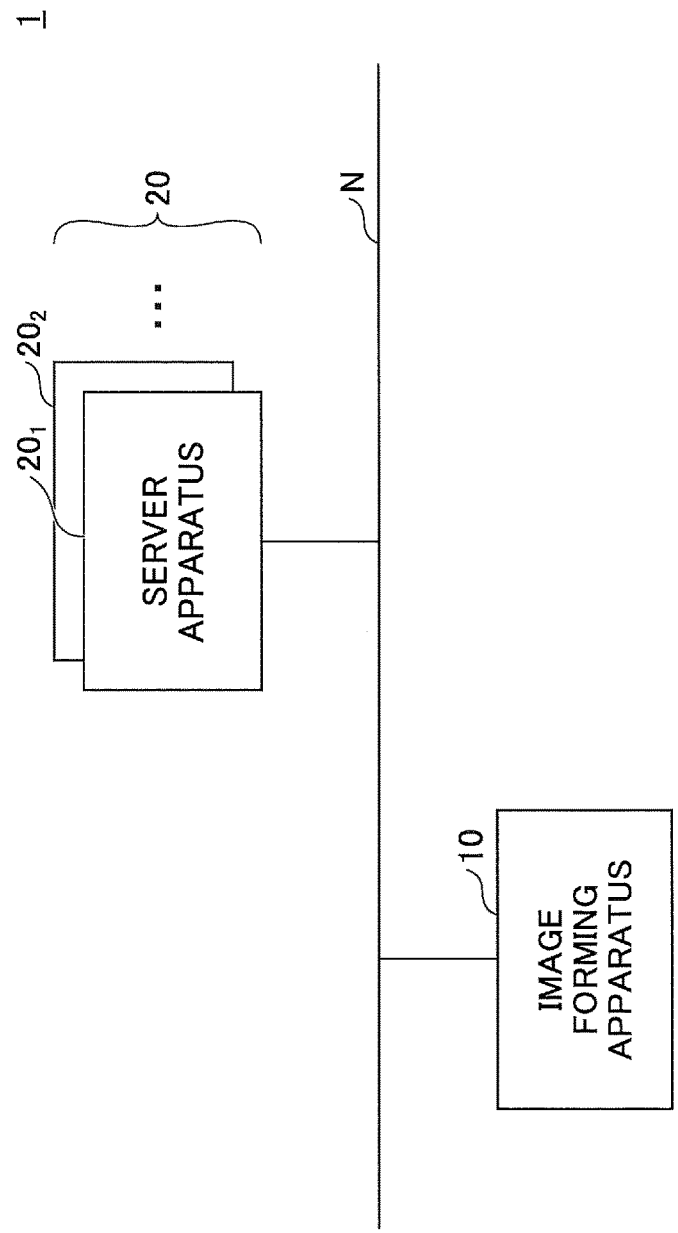
FIG. 1 is a diagram illustrating an example system configuration of a scan delivery system according to a first embodiment of the present invention.

The system configuration of a scan delivery system 1 according to a first embodiment of the present invention will be described below with reference to FIG. 1. FIG. 1 is a diagram illustrating an example system configuration of the scan delivery system 1 according to the first embodiment.

In FIG. 1, the scan delivery system 1 includes an image forming apparatus 10 and one or more server apparatuses 20 that are communicably connected via a network N such as a LAN (Local Area Network).

The image forming apparatus 10 is an information processing apparatus, such as an MFP, having an image processing function. The image forming apparatus 10 may have various image processing functions, such as a scan function, a copy function, a FAX communication function, and a print function, for example.

The image forming apparatus 10 according to the present embodiment enables a user to select desired transmission destination information from transmission destination information preregistered by an administrator, for example, so that image data generated by the scan function of the image forming apparatus 10 may be stored in the server apparatus 20 specified by the selected destination information. The service of storing the image data generated by the scan function of the image forming apparatus 10 in the server apparatus 20 in the manner described above may be referred to as "scan delivery service". That is, the image forming apparatus 10 according to the present embodiment can provide a scan delivery service to users.

The server apparatus 20 is an information processing apparatus that stores image data received from the image forming apparatus 10. The image forming apparatus 10 may also acquire image data from the server apparatus 20 to perform a printing operation using the print function. Note that in the following descriptions, the server apparatuses 20 may be referred to as "server apparatus $20_1$", "server apparatus $20_2$", and so on when distinguishing the server apparatuses 20 from each other.

Note that the server apparatus 20 according to the present embodiment is connected to the network N such as an in-house LAN, for example. However, the present invention is not limited thereto, and the server apparatus 20 may also be an information processing apparatus or a system that provides a storage service via the Internet (i.e., cloud storage), for example.

Note that the scan delivery system 1 illustrated in FIG. 1 is merely one example system configuration, and the scan delivery system 1 may have other various configurations. For example, the scan delivery system 1 may include a plurality of image forming apparatuses 10. Further, the scan delivery system 1 may include a digital camera, a projector, an electronic blackboard system, a video conference system, and/or a digital signage, for example.

That is, the server apparatus 20 is not limited to storing image data generated by the scan function of the image forming apparatus 10 and may also store image data generated by an electronic blackboard system or a digital camera, for example. Further, a projector or a digital signage may acquire the image data stored in the server apparatus 20 to project or display the acquired image data, for example.

<Hardware Configuration>

Figure 2:
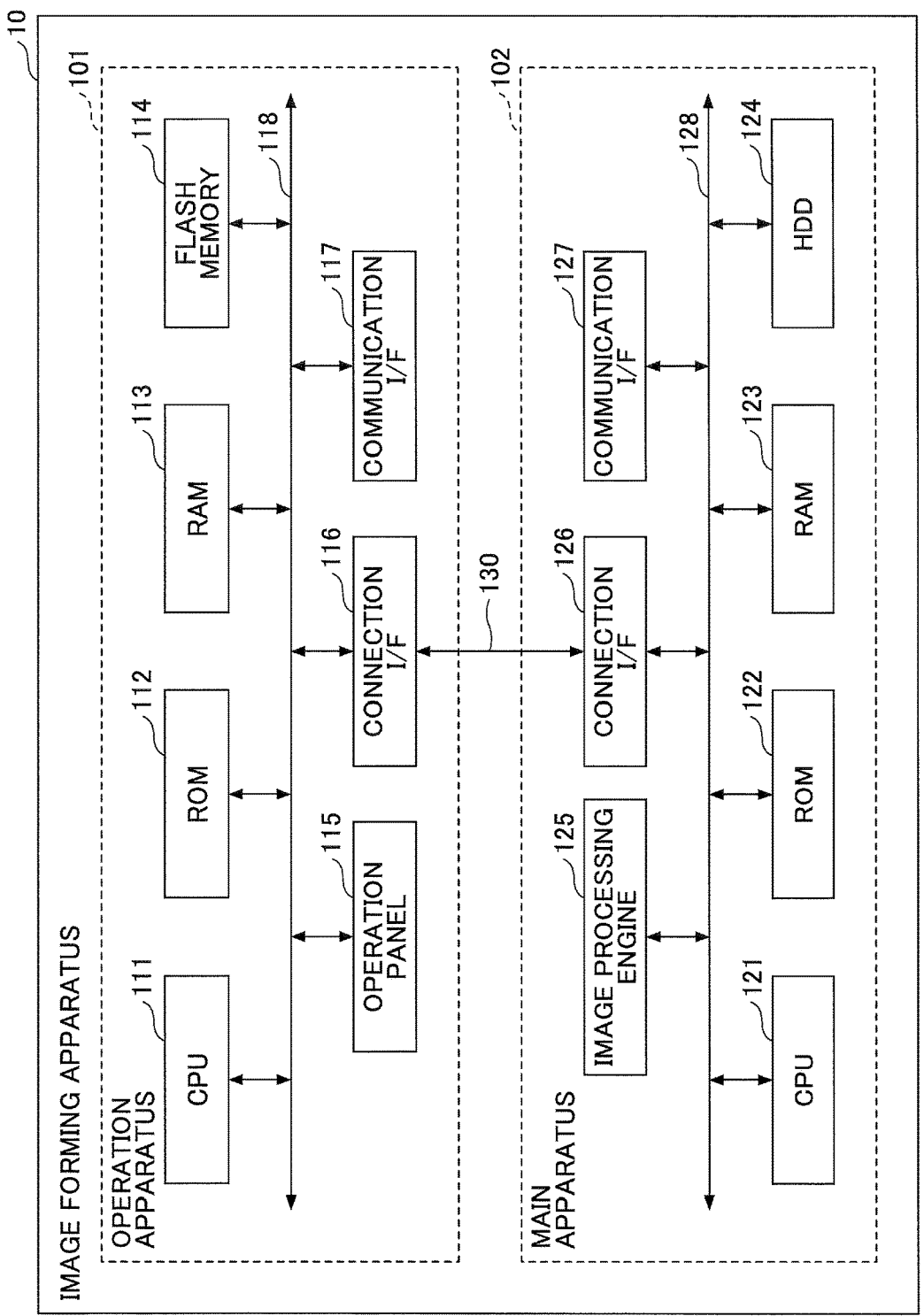
FIG. 2 is a diagram illustrating an example hardware configuration of an image forming apparatus according to the first embodiment.

In the following, the hardware configuration of the image forming apparatus 10 according to the first embodiment will be described with reference to FIG. 2. FIG. 2 is a diagram illustrating an example hardware configuration of the image forming apparatus 10 according to the first embodiment.

In FIG. 2, the image forming apparatus 10 includes an operation apparatus 101 and a main apparatus 102.

The operation apparatus 101 is used by a user to input various operations, such as a transmission destination information registration operation, a transmission destination information selection operation, an operation for selecting an image processing function to be executed by the main apparatus 102, an operation for inputting various setting values for executing the image processing function, and an operation for inputting an instruction to execute the image processing function, for example.

The operation apparatus 101 also displays various screens to the user, such as a screen for registering transmission destination information, a screen for selecting transmission destination information, a screen for inputting various setting values for executing an image processing function, and a screen for inputting an instruction for executing the image processing function, for example.

The main apparatus 102 performs various processes, such as executing an image processing function in response to various user operations input via the operation apparatus 101.

In FIG. 2, the operation apparatus 101 of the image forming apparatus 10 includes a CPU (Central Processing Unit) 111, a ROM (Read Only Memory) 112, and a RAM (Random Access Memory) 113. The operation apparatus 101 further includes a flash memory 114, an operation panel 115, a connection I/F 116, and a communication I/F 117. The above hardware units connected to each other via a bus 118.

The CPU 111 is an arithmetic unit that controls overall operations of the operation apparatus 101 by executing various programs stored in the ROM 112 or the flash memory 114 using the RAM 113 as a work area.

The ROM 112 is a nonvolatile semiconductor memory (storage device) that can hold data even when the power is turned off. The RAM 113 is a volatile semiconductor memory (storage device) that temporarily stores programs and data.

The flash memory 114 is a nonvolatile storage medium, and stores various programs to be executed by the CPU 111 (e.g., program for implementing processes according to the present embodiment) and various data.

The operation panel 115 is used by the user to input various operations. Further, the operation panel 115 displays various screens to the user. For example, the operation panel 115 may provide a GUI (Graphical User Interface) for enabling the user to perform various operations with respect to various functions of the image forming apparatus 10.

The connection I/F 116 is an interface for communicating with the main apparatus 102 via a communication path 130. For example, a USB (Universal Serial Bus) standard interface may be used as the connection I/F 116.

The communication I/F 117 is an interface for communicating with other devices. For example, a wireless LAN conforming to the Wi-Fi standard may be used as the communication I/F 117.

In FIG. 2, the main apparatus 102 of the image forming apparatus 10 includes a CPU 121, a ROM 122, and a RAM 123. The main apparatus 102 further includes an HDD (Hard Disk Drive) 124, an image processing engine 125, a connection I/F 126, and a communication I/F 127. The above hardware units are connected to each other via a bus 128.

The CPU 121 is an arithmetic unit that controls overall operations of the main apparatus 102 by executing various programs stored in the ROM 122 or the HDD 124 using the RAM 123 as a work area.

The ROM 122 is a nonvolatile semiconductor memory (storage device) that can hold data even when the power is turned off. The RAM 123 is a volatile semiconductor memory (storage device) for temporarily storing programs and data.

The HDD 124 is a nonvolatile storage medium, and stores various programs to be executed by the CPU 121 (e.g., program for implementing processes according to the present embodiment) and various data.

The image processing engine 125 is hardware that performs image processes for implementing various image processing functions such as a copy function, a scan function, a FAX communication function, a print function, and the like.

The image processing engine 125 may include a scanner device that optically scans a document to generate image data, a plotter device that performs printing on a sheet material such as paper, and a FAX communication device that performs FAX communication, for example. The image processing engine 125 may also include a finisher for sorting printed sheets and/or, an ADF (automatic document feeder) for automatically feeding a document, for example.

The connection I/F 126 is an interface for communicating with the operation apparatus 101 via the communication path 130. For example, a USB standard interface may be used as the connection I/F 126.

The communication I/F 127 is an interface for communicating with other devices. For example, a wireless LAN conforming to the Wi-Fi standard may be used as the communication I/F 127.

The image forming apparatus 10 according to the present embodiment having the hardware configuration as illustrated in FIG. 2 uses one or more of the above-described hardware units to implement various processes as described below.

Note that in FIG. 2, a configuration in which the image forming apparatus 10 includes the operation apparatus 101 is illustrated as an example, but the present invention is not limited thereto. For example, an information processing terminal such as a smartphone, a tablet terminal, a mobile phone, and/or a PDA may function as an operation apparatus of the image forming apparatus 10. That is, in some embodiments, such an information processing terminal can control the image forming apparatus 10 by communicating with the image forming apparatus 10 via the communication I/F 117 of the operation apparatus 101 or the communication I/F 127 of the main apparatus 102, for example.

Figure 3:
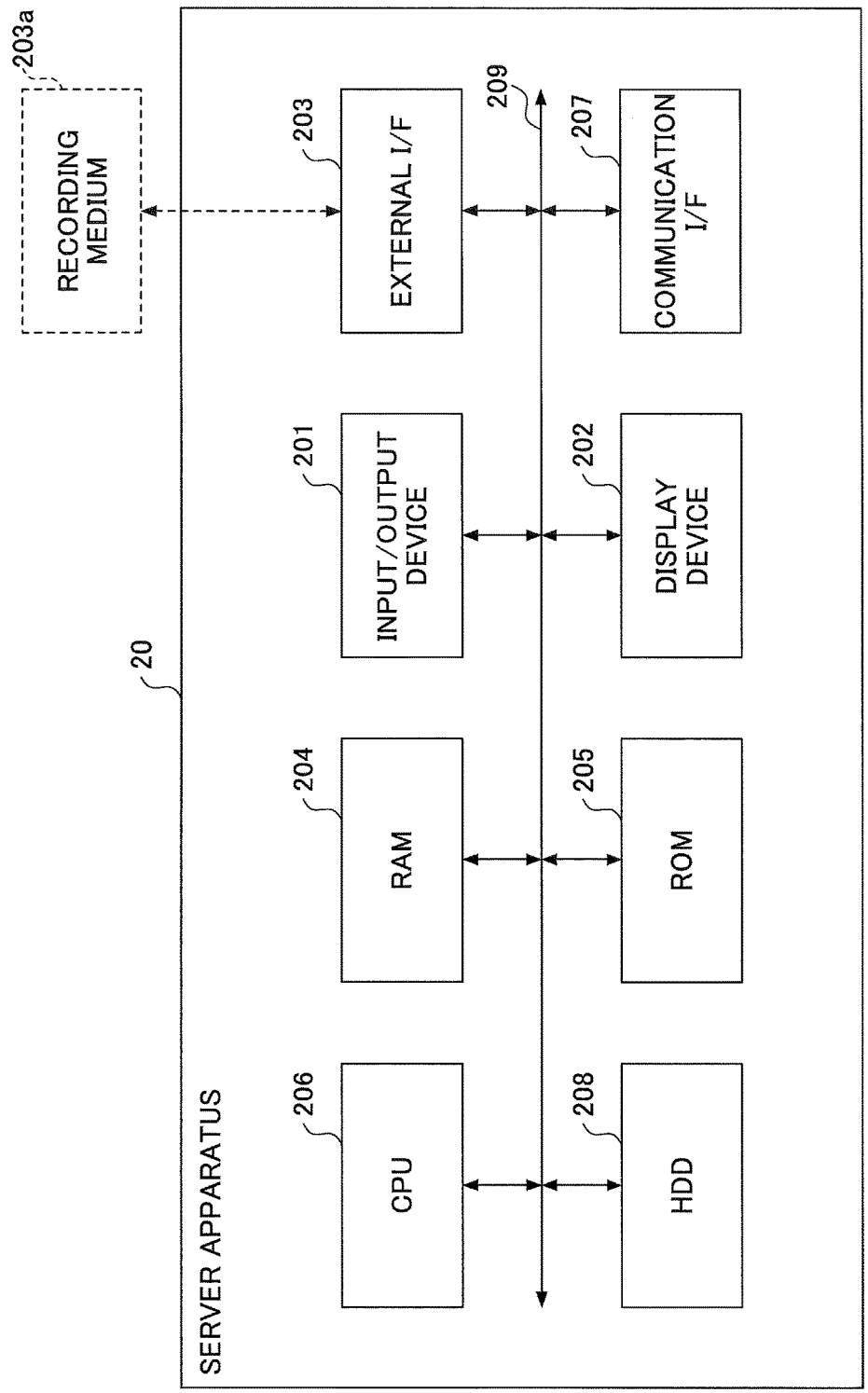
FIG. 3 is a diagram illustrating an example hardware configuration of a server apparatus according to the first embodiment.

In the following, the hardware configuration of the server apparatus 20 according to the first embodiment will be described with reference to FIG. 3. FIG. 3 is a diagram illustrating an example hardware configuration of the server apparatus 20 according to the first embodiment.

In FIG. 3, the server apparatus 20 includes an input device 201, a display device 202, an external I/F 203, a RAM 204, a ROM 205, a CPU 206, a communication I/F 207, and an HDD 208. The above hardware units are connected to each other via a bus 209.

The input device 201 may include a keyboard, a mouse, a touch panel, and the like that are used by the user to perform various operations. The display device 202 is a display for displaying a processing result of the server apparatus 20, for example. Note that in some embodiments, at least one of the input device 201 and the display device 202 may be connected to the server apparatus 20 as necessary when being used, for example.

The external I/F 203 is an interface with an external device. The external device may include a recording medium 203a, for example. In this way, the server apparatus 20 may be able to read/write data from/on the recording medium 203a via the external I/F 203. Note that the recording medium 203a may be a flexible disk, a CD, a DVD, an SD memory card, or a USB memory, for example.

The RAM 204 is a volatile semiconductor memory (storage device) that temporarily stores programs and data. The ROM 205 is a nonvolatile semiconductor memory (storage device) that can hold data even when the power is turned off.

The CPU 206 is an arithmetic unit that controls overall operations of the server apparatus 20 by executing various programs stored in the ROM 205 or the HDD 208 using the RAM 204 as a work area.

The communication I/F 207 is an interface for communicating with other devices. The HDD 208 is a nonvolatile storage medium, and stores various programs to be executed by the CPU 206 (e.g., program for implementing processes according to the present embodiment) and various data.

The server apparatus 20 according to the present embodiment having the hardware configuration illustrated in FIG. 3 may use one or more of the above-described hardware unit to implement various processes as described below.

<Hierarchical Structure of Program Group of Image Forming Apparatus 10>

Figure 4:
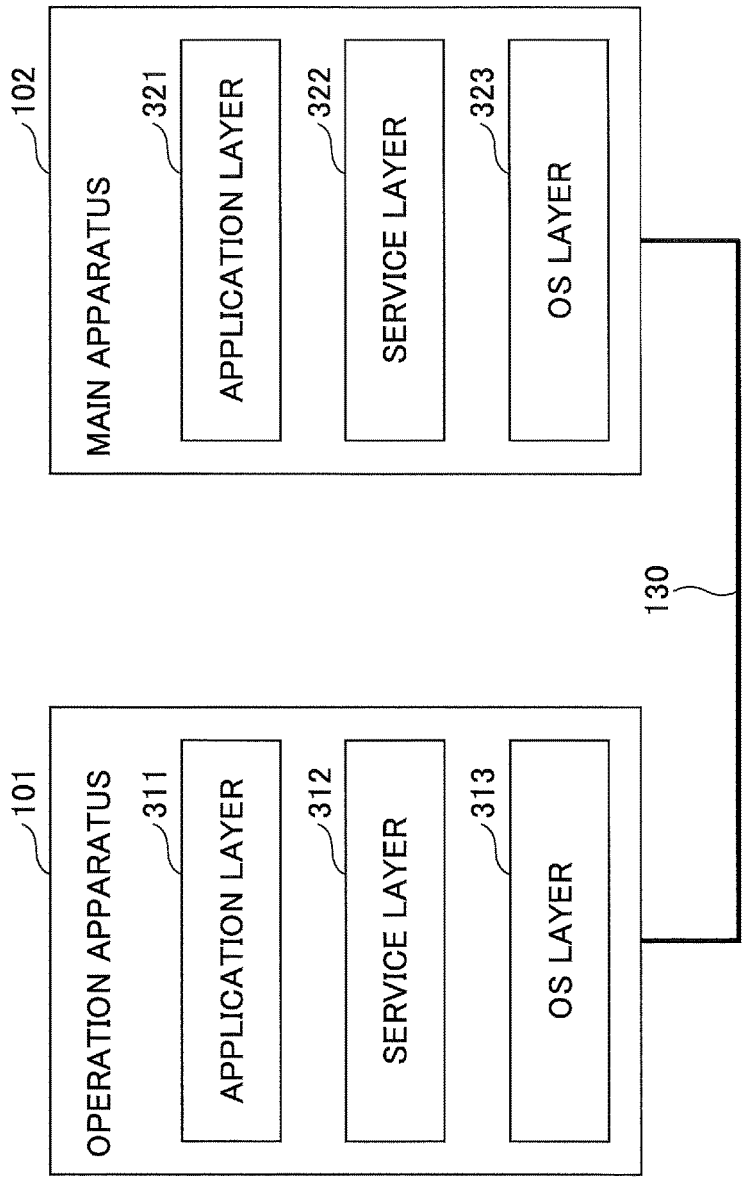
FIG. 4 is a diagram illustrating example hierarchical structures of program groups included in an operation apparatus and a main apparatus of the image forming apparatus according to the first embodiment.

In the following, hierarchical structures of program groups included in the operation apparatus 101 and the main apparatus 102 of the image forming apparatus 10 will be described with reference to FIG. 4. FIG. 4 is a diagram illustrating example hierarchical structures of program groups included in the operation apparatus 101 and the main apparatus 102 of the image forming apparatus 10 according to the first embodiment.

FIG. 4 illustrates a hierarchical structure of programs included in the operation apparatus 101 (ROM 112, flash memory 114) and a hierarchical structure of programs included in the main apparatus 102 (ROM 122, HDD 124).

First, the hierarchical structure of a program group included in the main apparatus 102 (ROM 122, HDD 124) will be described. The program group included in the main apparatus 102 can be roughly categorized into an application layer 321, a service layer 322, and an OS layer 323.

A program categorized into the application layer 321 is a program for operating hardware resources to implement an image processing function. Specifically, the application layer 321 may include a scan application, a copy application, a FAX application, a print application, and the like.

A program categorized into the service layer 322 is a program interposed between the application layer 321 and the OS layer 323. The program acts as an interface for enabling programs of the application layer 321 to use the hardware resources of the main apparatus 102 and providing notifications on the statuses of the hardware resources of the main apparatus 102.

Specifically, the service layer 322 may accept an operation request for operating a hardware resource and arbitrate the accepted operation request. The operation request accepted by the service layer 322 may include, for example, an operation request for image processing by the image processing engine 125 (e.g., a scan operation request to the scanner device or a print operation request to the plotter device).

Note that the service layer 322 also acts as an interface with respect to a program of an application layer 311 of the operation apparatus 101. That is, a program categorized into the application layer 311 of the operation apparatus 101 may similarly access the service layer 322 of the main apparatus 102 to operate hardware resources of the main apparatus 102 to implement an image processing function.

The program categorized into the OS layer 323 is a program called basic software, and provides a basic function of controlling hardware resources of the main apparatus 102. The program categorized into the OS layer 323 accepts operation requests for operating hardware resources of the main apparatus 102 from a program categorized into the application layer 321 via a program categorized into the service layer 322 and performs processes according to the operation requests.

In the following, the hierarchical structure of the program group included in the operation apparatus 101 (ROM 112, flash memory 114) will be described. Like the main apparatus 102, the program group included in the operation apparatus 101 can also be roughly categorized into an application layer 311, a service layer 312, and an OS layer 313.

However, functions provided by a program categorized into the application layer 311 and the types of operation requests that can be accepted by a program categorized into the service layer 312 are different from those of the main apparatus 102. The program categorized into the application layer 311 of the operation apparatus 101 mainly provides user interface functions for performing various operations and displaying relevant information.

Note that in the present embodiment, it is assumed that an OS (Operating System) of the operation apparatus 101 and an OS of the main apparatus 102 operate independently. Also, provided the operation apparatus 101 and the main apparatus 102 are capable of communicating with each other, the OS of the operation apparatus 101 and the OS of the main apparatus 102 do not necessarily have to be the same type of OS. For example, the operation apparatus 101 may use Android (registered trademark) as its OS while the main apparatus 102 uses Linux (registered trademark) as its OS.

As described above, in the image forming apparatus 10 according to the present embodiment, the operation apparatus 101 and the main apparatus 102 may be controlled by different operating systems, and as such, communication between the operation apparatus 101 and the main apparatus 102 may not be regarded as inter-process communication within one apparatus but may instead be regarded as inter-apparatus communication between different information processing apparatuses. For example, such inter-apparatus communication may include an operation of transmitting information indicating various user operations accepted by the operation apparatus 101 to the main apparatus 102 and an operation of the main apparatus 102 transmitting a request to instruct display of a display screen to the operation apparatus 101.

Note, however, that the image forming apparatus 10 according to an embodiment of the present invention is not limited to a case where different types of operating systems are run on the operation apparatus 101 and the main apparatus 102. That is, in some embodiments, the same type of OS may be run on the operation apparatus 101 and the main apparatus 102. Also, the image forming apparatus 10 according to an embodiment of the present invention is not limited to a case where the OS of the operating apparatus 101 and the OS of the main apparatus 102 operate independently. That is, in some embodiments, one OS may be running on the operation apparatus 101 and the main apparatus 102, for example.

<Functional Configuration>

Figure 5:
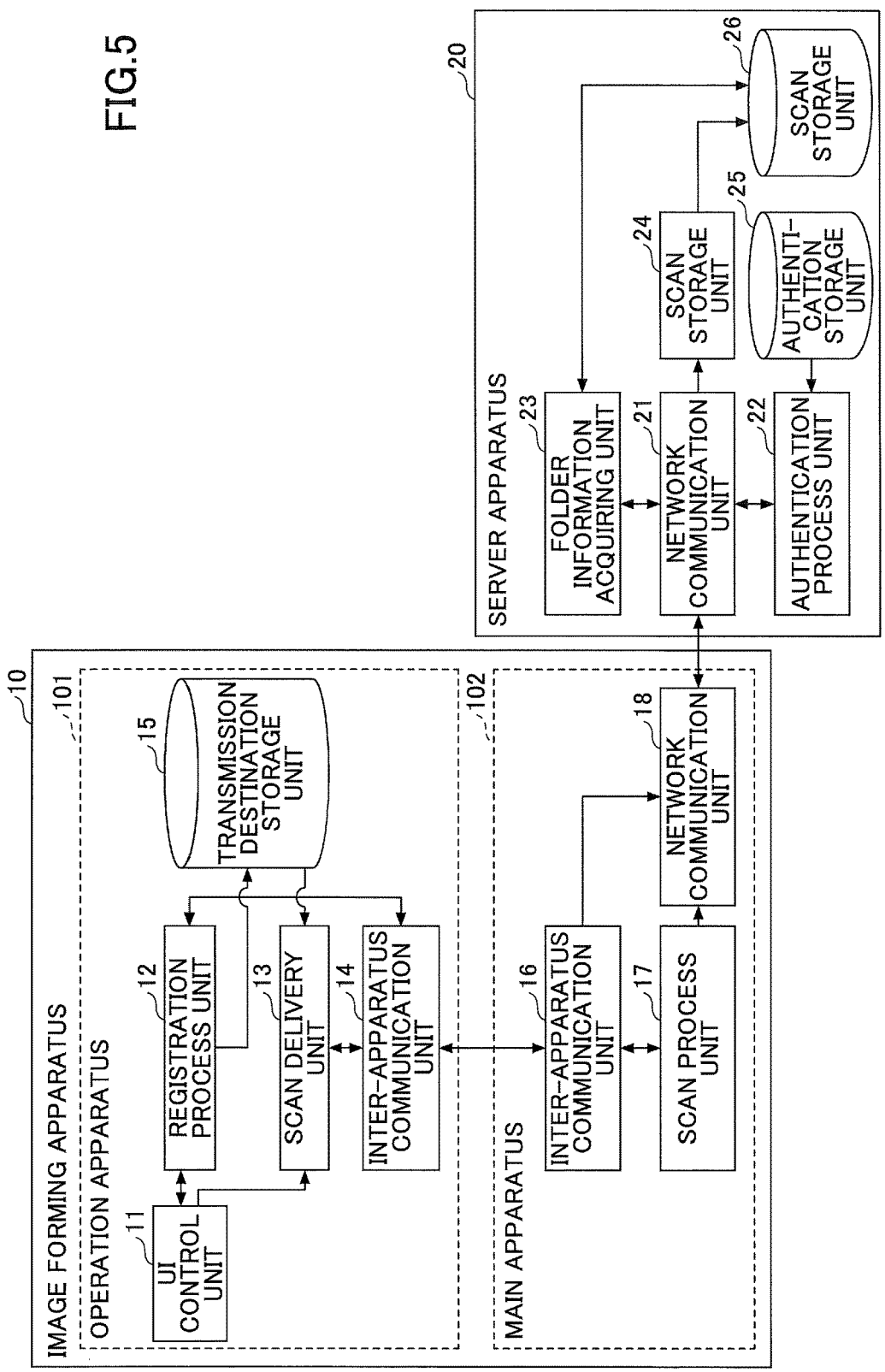
FIG. 5 is a diagram illustrating an example functional configuration of a scan delivery system according to the first embodiment.

In the following, the functional configuration of the scan delivery system 1 according to the first embodiment will be described with reference to FIG. 5. FIG. 5 is a diagram illustrating an example functional configuration of the scan delivery system 1 according to the first embodiment.

In FIG. 5, the operation apparatus 101 of the image forming apparatus 10 includes a UI (user interface) control unit 11, a registration process unit 12, a scan delivery unit 13, and an inter-apparatus communication unit 14. Each of these functional units may be implemented by the CPU 111 executing a process based on one or more programs included in the operation apparatus 101, for example.

The operation apparatus 101 of the image forming apparatus 10 also includes a transmission destination storage unit 15. The transmission destination storage unit 15 may be implemented by the flash memory 114 of the operation apparatus 101, for example.

The UI control unit 11 accepts input of various operations from the user and displays various screens to the user. For example, the UI control unit 11 may accept a transmission destination information registration operation for registering transmission destination information from a user such as an administrator. Also, the UI control unit 11 may accept a transmission destination information selection operation or a scan delivery service usage start operation from a user such as a general user, for example. Further, the UI control unit 11 may display a screen for registering transmission destination information (transmission destination registration screen), for example.

A user such as an administrator may operate a transmission destination registration screen to input or select various items of information (e.g., URL of the server apparatus 20, user name, and password) as transmission destination information. Note that in the following descriptions, the URL of the server apparatus 20, the user name, and the password may also be referred to as "server information".

When the control unit 11 accepts a transmission destination information registration operation for registering transmission destination information, the registration process unit 12 performs processes related to registration of the transmission destination information.

That is, the registration process unit 12 determines whether the server information input to the transmission destination registration screen is valid. If it is determined that the server information is valid, the registration process unit 12 sends an acquisition request to the server apparatus 20 to acquire folder information indicating a folder hierarchy of folders in the server apparatus 20.

Also, the registration process unit 12 generates transmission destination information including the server information and various items of information (e.g., a server name, a root folder, an icon) input by the user such as an administrator, and stores the generated transmission destination information in the transmission destination storage unit 15.

In this way, transmission destination information including valid server information input by a user such as an administrator may be registered in the image forming apparatus 10. That is, valid transmission destination information may be registered in the image forming apparatus 10.

Note that the registration process unit 12 according to the present embodiment determines the validity of the server information by sending an authentication request to the server apparatus 20 specified by the URL included in the server information via the main apparatus 102.

When an authentication process performed in response to the authentication request is successful, the registration process unit 12 registers the transmission destination information including the server information in the image forming apparatus 10. On the other hand, the registration process unit 12 does not register the transmission destination information in the image forming apparatus 10 when the authentication process is unsuccessful (including a case where the URL is incorrect).

In this way, transmission destination information including invalid server information may be prevented from being registered in the image forming apparatus 10. That is, invalid transmission destination information may be prevented from being registered in the image forming apparatus 10.

When the UI control unit 11 accepts a scan delivery service start operation, the scan delivery unit 13 performs processes related to the scan delivery service.

That is, first, the scan delivery unit 13 transmits a scan request to the main apparatus 102 to scan a document and generate image data. Then, the scan delivery unit 13 sends a request to the main apparatus 102 to have the generated image data transmitted to the server apparatus 20 specified by a URL included in selected transmission destination information. In this way, image data may be transmitted and stored in the server apparatus 20 specified by the transmission destination information selected by a user such as a general user, for example.

The inter-apparatus communication unit 14 communicates with the main apparatus 102. For example, the inter-apparatus communication unit 14 may receive an authentication request from the registration process unit 12 and transmits the authentication request to the main apparatus 102. Also, the inter-apparatus communication unit 14 may receive a scan request or an image data delivery request from the scan delivery unit 13 and transmit the received request to the main apparatus 102.

The transmission destination storage unit 15 stores the transmission destination information registered by the registration process unit 12. Note that the transmission destination information stored in the transmission destination storage unit 15 is described in detail below.

The main apparatus 102 of the image forming apparatus 10 includes an inter-apparatus communication unit 16, a scan process unit 17, and a network communication unit 18. Each of the above functional units may be implemented by the CPU 121 executing a process based on one or more programs included in the main apparatus 102, for example.

The inter-apparatus communication unit 16 communicates with the operation apparatus 101. For example, the inter-apparatus communication unit 16 may receive an authentication request, a scan request, a folder information acquisition request, or an image data delivery request from the inter-apparatus communication unit 14 of the operation apparatus 101.

When the inter-apparatus communication unit 16 receives a scan request from the inter-apparatus communication unit 14, the scan process unit 17 scans a document and generates image data. Further, when the inter-apparatus communication unit 16 receives an image data delivery request from the inter-apparatus communication unit 14, the scan process unit 17 transmits an image data storage request to the corresponding server apparatus 20 via the network communication unit 18.

The network communication unit 18 communicates with the server apparatus 20. For example, when the inter-apparatus communication unit 16 receives an authentication request, the network communication unit 18 transmits the received authentication request to the corresponding server apparatus 20.

In FIG. 5, the server apparatus 20 includes a network communication unit 21, an authentication process unit 22, a folder information acquiring unit 23, and a scan storage unit 24. Each of the above functional units may be implemented by the CPU 206 executing a process based on one or more programs included in the server apparatus 20, for example.

The server apparatus 20 also includes an authentication storage unit 25 and a scan storage unit 26. The above storage units may be implemented by the HDD 208, for example.

The network communication unit 21 communicates with the image forming apparatus 10. For example, the network communication unit 21 may receive an authentication request, a folder information acquisition request, or an image data storage request of image data from the image forming apparatus 10.

When the network communication unit 21 receives an authentication request or an image data storage request from the image forming apparatus 10, the authentication process unit 22 performs an authentication process. For example, the authentication process unit 22 may perform the authentication process by determining whether a user name and a password (authentication information) included in the authentication request or the image data storage request is stored in the authentication storage unit 25.

When the network communication unit 21 receives a folder information acquisition request from the image forming apparatus 1, the folder information acquiring unit 23 acquires the requested folder information. For example, the folder information acquiring unit 23 may acquire folder information indicating the hierarchy of folders available to the user specified by the user name included in the folder information acquisition request. Note that the folder information may include a folder ID identifying a folder and a folder ID of a folder (parent folder) including the folder, for example.

The scan storage unit 24 stores image data included in an image data storage request in the scan storage unit 26 when the authentication process unit 22 successfully authenticates the image data storage request.

The authentication storage unit 25 stores authentication information used in the authentication process performed by the authentication process unit 22. The authentication information may include a combination of a user name and a password, for example.

The scan storage unit 26 stores image data generated by a scanning operation performed by the image forming apparatus 10.

In the following, the transmission destination information stored in the transmission destination storage unit 15 will be described with reference to FIG. 6. FIG. 6 is a diagram illustrating an example of transmission destination information.

In FIG. 6, the transmission destination information stored in the transmission destination storage unit 15 includes information items, such as "URL", "user name", "password", "server name", "root folder", and "icon". Note that the server information includes the information items "URL", "user name", and "password" of the transmission destination information.

The "URL" is information indicating the address of the server apparatus 20. For example, "http://abc.server1.co.jp" is indicated as the URL of the server apparatus $20_1$. Also, "http://123.server1.co.jp" is indicated as the URL of the server apparatus $20_2$.

Note that information indicating the address of the server apparatus 20 is not limited to a URL. For example, an IP (Internet Protocol) address, or a host name may also be used to indicate the address of the server apparatus 20. That is, any type of information that can identify the server apparatus 20 can be used as an address of the server apparatus 20.

The "user name" and "password" correspond to a user name and a password used as authentication information in an authentication process performed by the server apparatus 20. The user name is information identifying a user (e.g., user ID). Note that the authentication information used in the authentication process performed by the server apparatus 20 is not limited to a user name and a password, but may be other types of information such as an authentication token, for example.

The "server name" indicates the name of the server apparatus 20. The "root folder" indicates a default storage folder for storing image data. "Icon" indicates image data of an icon (display component) to be displayed when a user, such as a general user, is to select transmission destination information.

<Process Operations>

In the following, process operations of the scan delivery system 1 according to the present embodiment will be described.

Figure 7:
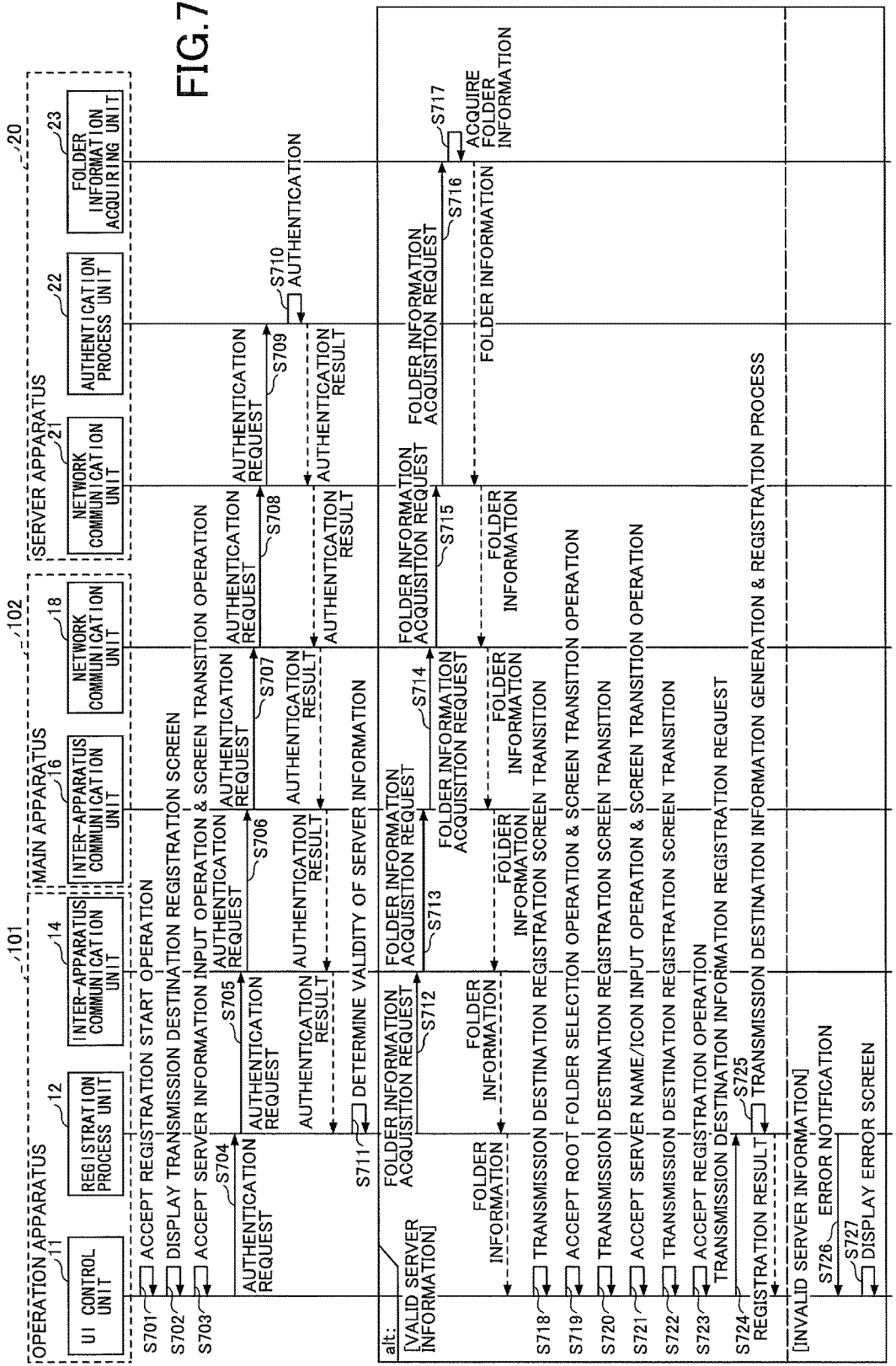
FIG. 7 is a sequence chart illustrating an example overall process relating to transmission destination registration according to the first embodiment.

First, with reference to FIG. 7, an overall process implemented in a case where a user such as an administrator registers transmission destination information in the image forming apparatus 10 is described. FIG. 7 is a sequence chart illustrating an example overall process relating to transmission destination registration according to the first embodiment. In FIG. 7, it is assumed that the user is a special user such as an administrator.

First, the user operates the operation apparatus 101 to perform an operation (registration start operation) for starting registration of transmission destination information. In turn, the UI control unit 11 of the operation apparatus 101 accepts the registration start operation (step S701).

Figure 8:
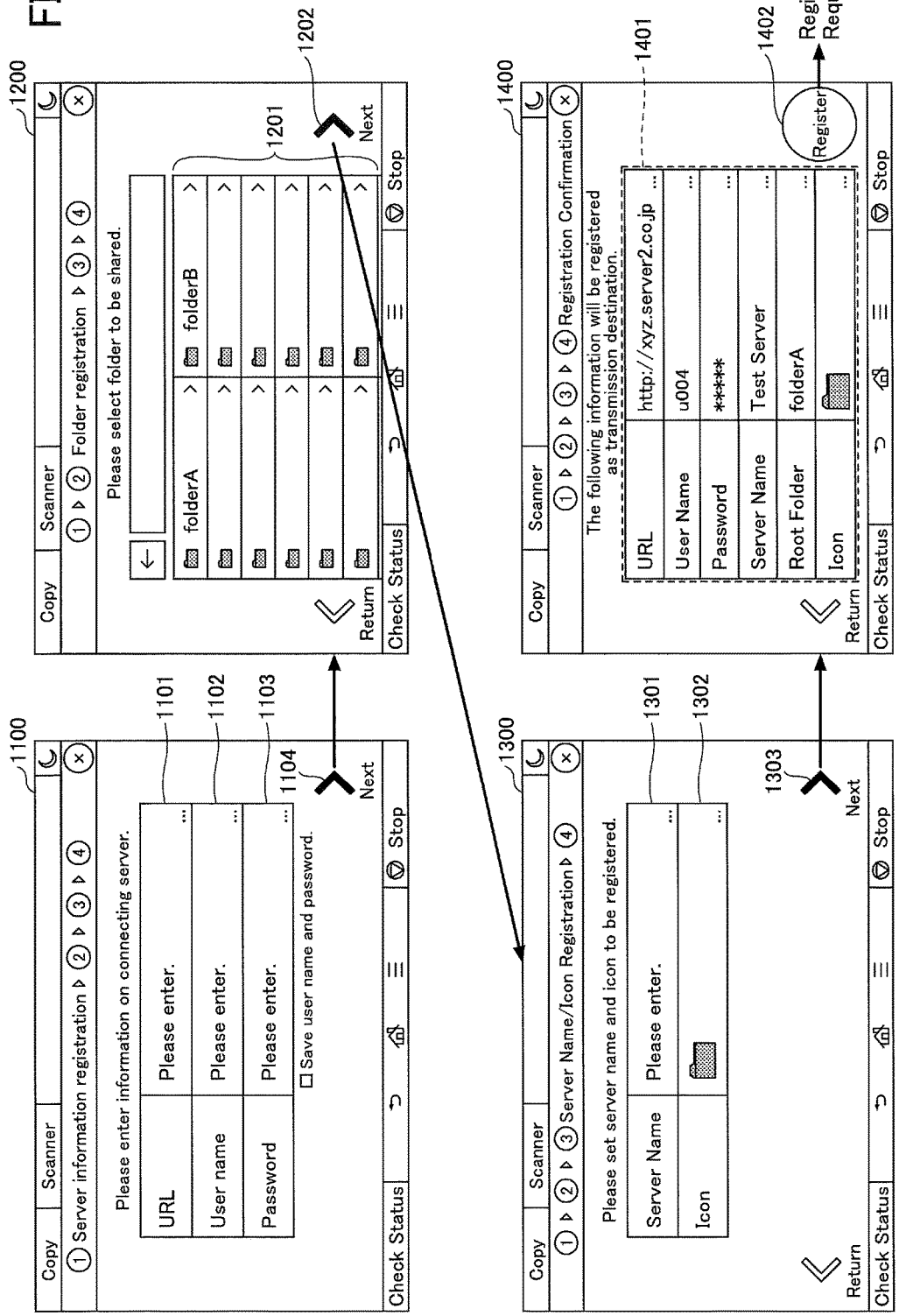
FIG. 8 is a diagram illustrating example screen transitions of a transmission destination registration screen.

Upon accepting the registration start operation, the UI control unit 11 displays a transmission destination registration screen 1100 as illustrated in FIG. 8, for example (step S702).

The destination registration screen 1100 illustrated in FIG. 8 includes a URL input field 1101 for inputting the URL of the server apparatus 20 to be registered as a transmission destination, a user name input field 1102 for inputting a user name, and a password input field 1103 for inputting a password.

The user performs a server information input operation by inputting a URL, a user name, and a password in the URL input field 1101, the user name input field 1102, and the password input field 1103, respectively. After performing the server information input operation, the user presses a "next" button 1104 to perform a screen transition operation.

When the server information input operation and the screen transition operation are performed, the UI control unit 11 accepts these operations (step S703). Upon accepting the server information input operation and the screen transition operation, the UI control unit 11 transmits an authentication request to the registration process unit 12 (step S704).

Note that the authentication request transmitted in step S704 corresponds to a request to have the server apparatus 20 specified by the URL input to the URL input field 1101 perform an authentication process. The authentication request includes the URL input to the URL input field 1101, the user name input to the user name input field 1102, and the password input to the password input field 1103. That is, the authentication request includes the server information that has been input by the user.

Then, the registration process unit 12 of the operation apparatus 101 transmits the authentication request to the main apparatus 102 via the inter-apparatus communication unit 14 (steps S705 and S706).

Then, upon receiving the authentication request from the operation apparatus 101 via the inter-apparatus communication unit 16, the network communication unit 18 of the main apparatus 102 transmits the authentication request to the corresponding server apparatus 20 (steps S707 and S708). That is, the network communication unit 18 transmits the authentication request to the server apparatus 20 specified by the URL included in the authentication request received by the inter-apparatus communication unit 16.

Upon receiving an authentication request from the main apparatus 102 via the network communication unit 21, the authentication process unit 22 of the server apparatus 20 performs an authentication process based on the authentication request (steps S709 and S710). That is, the authentication process unit 22 determines whether the combination of the user name and the password included in the authentication request is stored in the authentication storage unit 25.

If the authentication process unit 22 determines that the combination of the user name and the password included in the authentication request is stored in the authentication storage unit 25, the authentication process unit 22 returns an authentication result indicating successful authentication to the operation apparatus 101 via the main apparatus 102. On the other hand, if the authentication process unit 22 determines that the combination of the user name and the password included in the authentication request is not stored in the authentication storage unit 25, the authentication process unit 22 returns an authentication result indicating authentication failure to the operation apparatus 101 via the main apparatus 102.

Upon receiving the authentication result from the server apparatus 20 via the main apparatus 102, the registration process unit 12 of the operation apparatus 101 determines that the server information (URL, user name, and password) input in step S703 is valid (step S711).

Note that when the registration process unit 12 receives an authentication result indicating successful authentication from the server apparatus 20, the registration process unit 12 determines that the server information is valid. On the other hand, when the registration process unit 12 receives an authentication result indicating authentication failure from the server apparatus 20, the registration process unit 12 determines that the server information is invalid.

Also, the registration process unit 12 determines that the server information is invalid when the URL included in the server information is incorrect (e.g., when a server apparatus 20 specified by the URL does not exist). In this case, for example, the registration process unit 12 may receive from the main apparatus 102 a notification indicating that the server apparatus 20 specified by the URL does not exist.

If it is determined in step S711 that the server information is valid, the registration process unit 12 transmits a folder information acquisition request to the main apparatus 102 via the inter-apparatus communication unit 14 (steps S712 and S713). Note that the folder information acquisition request may include the user name of the user that has been successfully authenticated in step S710 and an access token issued in response to the successful authentication, for example.

Then, upon receiving the folder information acquisition request from the operation apparatus 101 via the inter-apparatus communication unit 16, the network communication unit 18 of the main apparatus 102 transmits the folder information acquisition request to the corresponding server apparatus 20 (steps S714 and S715). That is, the network communication unit 18 transmits the folder information acquisition request to the server apparatus 20 specified by the URL included in the folder information acquisition request received by the inter-apparatus communication unit 16.

Upon receiving the folder information acquisition request from the main apparatus 102 via the network communication unit 21, the folder information acquiring unit 23 of the server apparatus 20 acquires folder information based on the received folder information acquisition request (steps S716 and S717). That is, the folder information acquiring unit 23 acquires folder information indicating the hierarchy of folders available to the user that has been successfully authenticated in step S710, based on the user name and the access token included in the folder information acquisition request, for example.

Then, the folder information acquiring unit 23 transmits the acquired folder information to the operation apparatus 101 via the main apparatus 102.

Upon receiving the folder information from the server apparatus 20 via the main apparatus 102, the UI control unit 11 of the operation apparatus 101 causes a screen transition from the transmission destination registration screen 1100 to a transmission destination registration screen 1200 as illustrated in FIG. 8 (step S718). That is, the UI control unit 11 displays the destination registration screen 1200 illustrated in FIG. 8.

The destination registration screen 1200 of FIG. 8 includes a folder selection field 1201 for selecting a root folder (also referred to as "default folder" or "home folder") in the server apparatus 20 to be registered as a transmission destination.

The user may perform a root folder selection operation by selecting a given folder from the folder selection field 1201. After performing the root folder selection operation, the user may press a "next" button 1202 to perform a screen transition operation.

When the root folder selection operation and the screen transition operation are performed by the user, the UI control unit 11 accepts these operations (step S719). Upon accepting the root folder selection operation and the screen transition operation, the UI control unit 11 causes a screen transition from the transmission destination registration screen 1200 to a transmission destination registration screen 1300 as illustrated in FIG. 8 (step S720). That is, the UI control unit 11 displays the destination registration screen 1300 as illustrated in FIG. 8.

The destination registration screen 1300 of FIG. 8 includes a server name input field 1301 for inputting the name of the server apparatus 20 to be registered as a transmission destination, and an icon selection field 1302 selecting an icon to be displayed when a user such as a general user is to select transmission destination information.

The user may perform server name/icon input operations by inputting a given name in the server name input field 1301 and selecting a given icon from a list of icons indicated in the icon selection field 1302, for example. Also, after performing the server name/icon input operations, the user may press a "next" button 1303 to perform a screen transition operation.

When the server name/icon input operations and the screen transition operation are performed by the user, the UI control unit 11 accepts these operations (step S721). Upon accepting the server name/icon input operations and the screen transition operation, the UI control unit 11 causes a screen transition from the transmission destination registration screen 1300 to a transmission destination registration screen 1400 as illustrated in FIG. 8 (step S722). That is, the UI control unit 11 displays the transmission destination registration screen 1400 as illustrated in FIG. 8.

The transmission destination registration screen 1400 of FIG. 8 includes a confirmation field 1401 for enabling the user to confirm the various items of information (URL, user name, password, server name, root folder, icon, etc.) input or selected by the user via the transmission destination registration screens 1100 to 1300.

After confirming the various items of information indicated in the confirmation field 1401, the user may perform a registration operation by pressing a "register" button 1402 for registering the transmission destination information.

When the registration operation is performed by the user, the UI control unit 11 accepts the operation (step S723). Upon accepting the registration operation, the UI control unit 11 transmits a transmission destination information registration request to the registration process unit 12 (step S724). The transmission destination information registration request includes the various items of information (URL, user name, password, server name, root folder, icon, etc.) input or selected by the user via the transmission destination registration screens 1100 to 1300.

Upon receiving the transmission destination information registration request from the UI control unit 11, the registration process unit 12 generates and registers transmission destination information (step S725). That is, the registration process unit 12 generates transmission destination information based on the various items of information included in the transmission destination information registration request and stores the generated transmission destination information in the transmission destination storage unit 15, and in this way, the transmission destination information may be registered in the image forming apparatus 10. Then, the registration process unit 12 transmits a registration result to the UI control unit 11.

In this way, transmission destination information including valid server information (i.e., valid transmission destination information) may be registered in the image forming apparatus 10.

Note that in the example process of FIG. 7, when the "next" button 1104 in the transmission destination registration screen 1100 of FIG. 8 is pressed, the transmission destination registration screen 1200 is displayed. However, in other examples, the transmission destination registration screen 1300 may be displayed instead of the transmission destination registration screen 1200, for example. In this case, when the "next" button 1303 in the transmission destination registration screen 1300 is pressed, the transmission destination registration screen 1200 may be displayed. That is, the display order (screen transition order) of the transmission destination registration screen 1200 and the transmission destination registration screen 1300 may be reversed.

Figure 9:
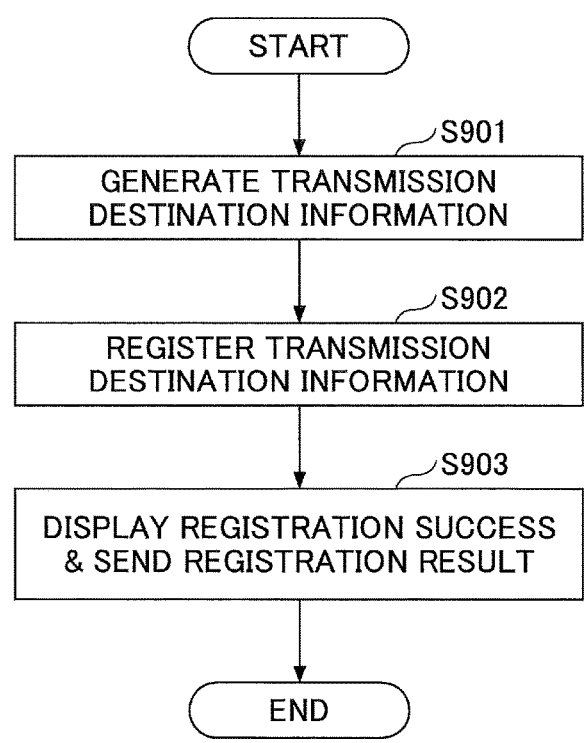
FIG. 9 is a flowchart illustrating an example process of generating and registering transmission destination information according to the first embodiment.

In the following, the process of generating and registering transmission destination information (process of step S725) according to the present embodiment will be described with reference to FIG. 9. FIG. 9 is a flowchart illustrating an example process of generating and registering transmission destination information according to the first embodiment.

First, the registration process unit 12 generates transmission destination information including various items of information (URL, user name, password, server name, root folder, icon, etc.) included in a transmission destination information registration request (step S901).

Then, the registration process unit 12 stores the transmission destination information generated in step S901 in the transmission destination storage unit 15 (step S902). As a result, the transmission destination information including the various items of information input by a user such as an administrator may be registered in the image forming apparatus 10.

Note that although the transmission destination information is stored in the destination storage unit 15 of the operation apparatus 101 in the above-described example, the present invention is not limited thereto. For example, the registration process unit 12 may transmit the transmission destination information to the main apparatus 102 such that the transmission destination information may be stored in a storage unit of the main apparatus 102.

Then, the registration process unit 12 transmits a registration result indicating successful registration to the UI control unit 11 (step S903).

As described above, when registering transmission destination information, the image forming apparatus 10 according to the present embodiment requests the server apparatus 20 specified by server information to perform authentication before generating and registering the transmission destination information. In this way, valid transmission destination information can be generated and registered in the image forming apparatus 10. In other words, the image forming apparatus 10 according to the present embodiment determines the validity of the transmission destination information to be registered by confirming whether it can establish connection with the server apparatus 20 specified by the server information.

Then, when it is determined that the transmission destination information to be generated and registered is valid, the registration process unit 12 generates the transmission destination information and registers the generated transmission destination information in the image forming apparatus 10. In this way, the image forming apparatus 10 according to the present embodiment can prevent invalid transmission destination information that cannot be used to establish connection with a server apparatus 20 from being registered in the image forming apparatus 10, for example.

Note that the image forming apparatus 10 according to the present embodiment determines the validity of server information (i.e., validity of transmission destination information to be generated and registered) by confirming whether authentication has been successfully performed in the server apparatus 20. However, validity determination of the transmission destination information to be generated and registered is not limited thereto. As described above, the image forming apparatus 10 may determine the validity of the transmission destination information to be generated and registered by confirming whether the URL included in the server information incorrect, for example. Also, the image forming apparatus 10 may determine the validity of the transmission destination information to be generated and registered by determining whether the root folder selected by the user exists in the server apparatus 20, for example.

Referring back to FIG. 7, if it is determined in step S711 that the server information is invalid, the registration process unit 12 transmits an error notification to the UI control unit 11 indicating that the server information is not valid (step S726). Upon receiving the error notification, the UI control unit 11 displays an error screen 1500 as illustrated in FIG. 10 (step S727).

Figure 10:
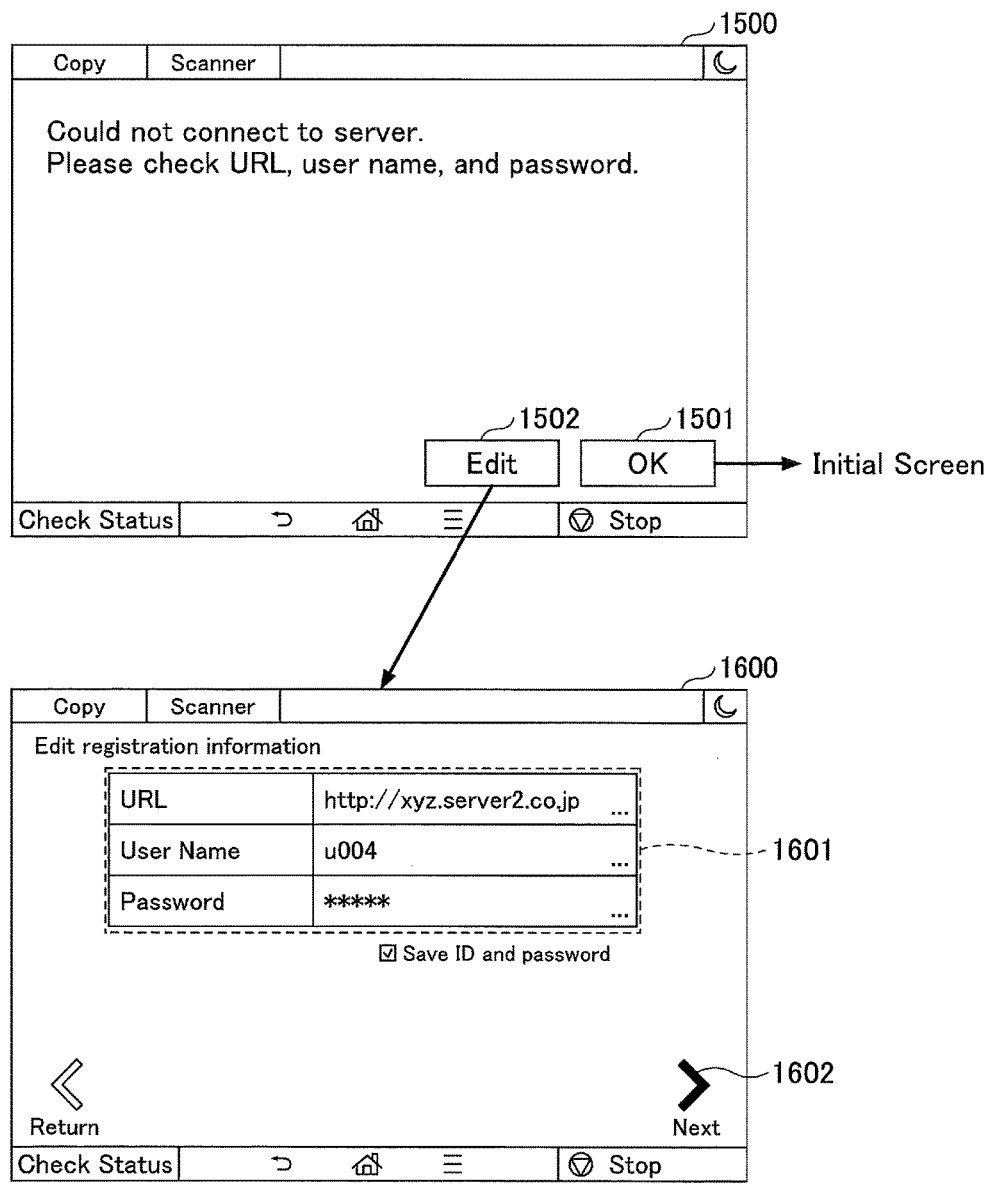
FIG. 10 is a diagram illustrating an example screen transition of an error screen.

The error screen 1500 of FIG. 10 is a screen indicating that connection could not be established with the server apparatus 20 specified by the URL included in the server information (authentication failure). The error screen 1500 of FIG. 10 includes an "OK" button 1501 for returning to the initial screen and an "edit" button 1502 for editing various items of information (URL, user name, password) included in the server information.

Note that the error screen 1500 of FIG. 10 indicates that connection could not be established with the server apparatus 20. However, information indicated in the error screen 1500 may vary depending on the type or error that has occurred, for example.

When the user presses the "OK" button 1501 of the error screen 1500, the UI control unit 11 accepts the operation and displays, an initial screen (start screen), for example. In this case, the server information input in step S703 of FIG. 7 is discarded.

On the other hand, when the user presses the "edit" button 1502, the UI control unit 11 accepts the operation and displays an edit screen 1600 as illustrated in FIG. 10. The edit screen 1600 of FIG. 10 includes an edit field 1601 for editing various items of information (URL, user name, password) included in the server information.

The user can edit the various items of information (URL, user name, password) included in the server information via the edit field 1601. When the user presses a "next" button 1602 of the edit screen 1600, the UI control unit 11 accepts the operation. Then, in a manner similar to step S704 of FIG. 7, the UI control unit 11 transmits an authentication request to the registration process unit 12. Note that the authentication request transmitted in this case includes the server information edited by the user via the edit field 1601. In this way, when server information that has been initially input is not valid, the user can edit the various items of information included in the server information.

Note that there may be a case where the server apparatus 20 specified by the URL input by the user via the transmission destination registration screen 1100 of FIG. 8 does not exist (i.e., the user has input an incorrect URL). In such a case, in step S727, the UI control unit 11 may receive a notification indicating that the server apparatus 20 specified by the URL does not exist. Upon receiving the notification indicating that the server apparatus 20 specified by the URL does not exist, the UI control unit 11 may display an error screen 1700 as illustrated in FIG. 11.

Figure 11:
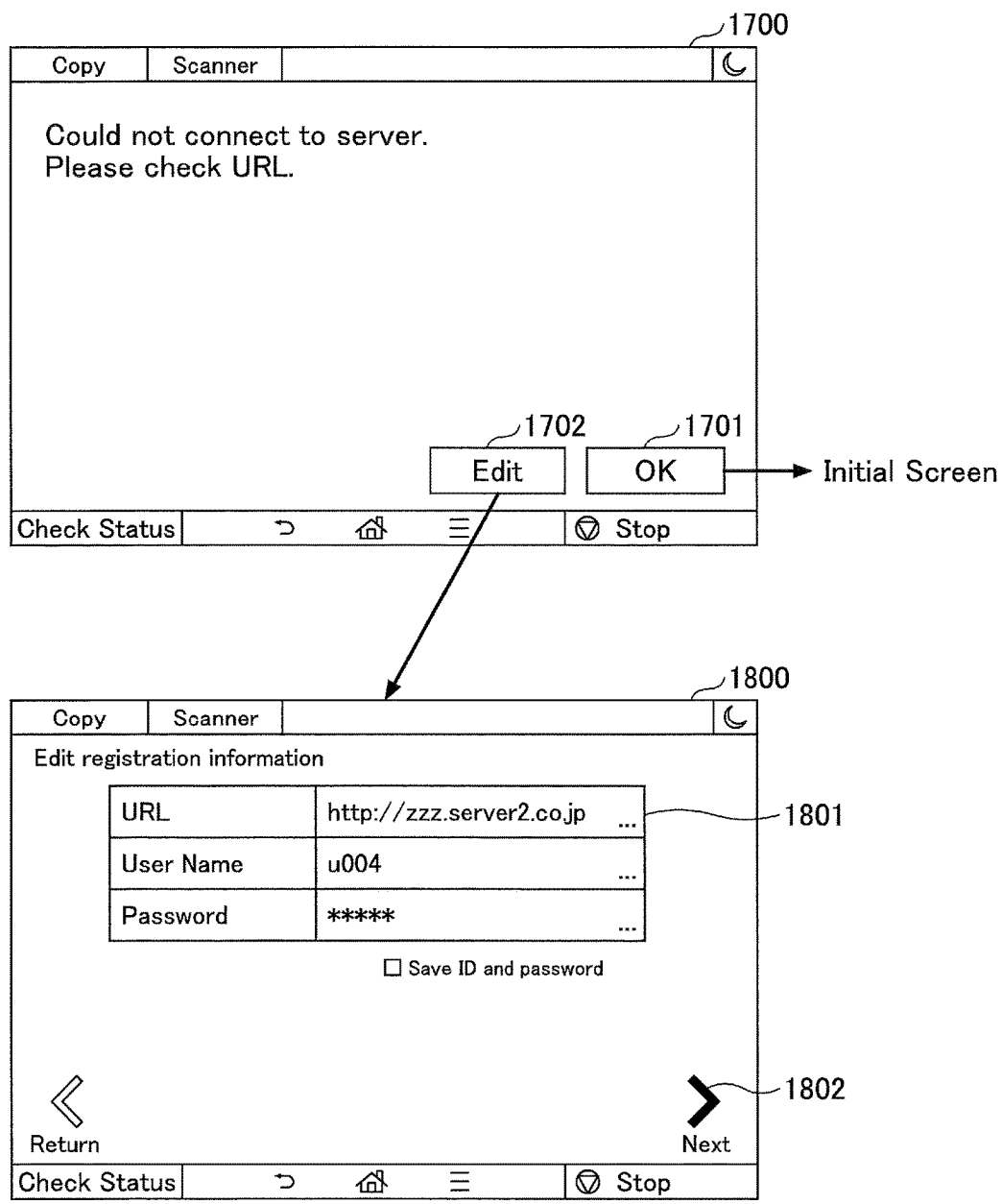
FIG. 11 is a diagram illustrating another example screen transition of the error screen.

The error screen 1700 of FIG. 11 is a screen indicating that connection could not be established with the server 20 specified by the URL included in the server information (i.e., the URL was incorrect). Like the error screen 1500 of FIG. 10, the error screen 1700 of FIG. 11 includes an "OK" button 1701 for returning to an initial screen and an "edit" button 1702 for editing various items of information (URL, user name, password) included in the server information.

When the user presses the "OK" button 1701, the UI control unit 11 accepts the operation and displays an initial screen (start screen), for example. In this case, the server information input in step S703 of FIG. 7 is discarded.

On the other hand, when the user presses the "edit" button 1702, the UI control unit 11 accepts the operation and displays an edit screen 1800 as illustrated in FIG. 11. The edit screen 1800 of FIG. 11 includes a URL edit field 1801 for editing the URL included in the server information.

The user can edit the URL included in the server information via the URL edit field 1801. When the user presses the "next" button 1802, the UI control unit 11 accepts the operation. Then, in a manner similar to step S704 of FIG. 7, the UI control unit 11 transmits an authentication request to the registration process unit 12. Note that the authentication request transmitted in this case includes server information including the URL edited via the URL edit field 1801.

As described above, when a server apparatus 20 specified by the URL input by the user does not exist (when the input URL is incorrect), the error screen 1700 that prompts the user to confirm the accuracy of the input URL may be displayed. In this way, the user may be notified of an error in the input URL before authentication is performed on the input user name and password.

Note that in a case where the server apparatus 20 specified by the URL input by the user exists but the combination of the user name and the password is incorrect, the image forming apparatus 10 may display an error screen that prompts the user to confirm the accuracy of only the user name and the password, for example.

As described above, the scan delivery system 1 according to the present embodiment confirms the validity of server information included in the transmission destination information to be generated and registered. Then, when it is determined that the server information is valid, the scan delivery system 1 according to the present embodiment generates the transmission destination information including the server information and registers the generated transmission destination information in the image forming apparatus 10. On the other hand, when it is determined that the server information is invalid, the scan delivery system 1 according to the present embodiment does not generate the transmission destination information.

In this way, the scan delivery system 1 according to the present embodiment can prevent invalid transmission destination information from being registered in the image forming apparatus 10.

Note that in the example process of FIG. 7, the operation apparatus 101 transmits an authentication request to the server apparatus 20 via the main apparatus 102. However, the present invention is not limited thereto. For example, the operation apparatus 101 may transmit the authentication request directly to the server apparatus 20 rather than transmitting the authentication request via the main apparatus 102.

Figure 12:
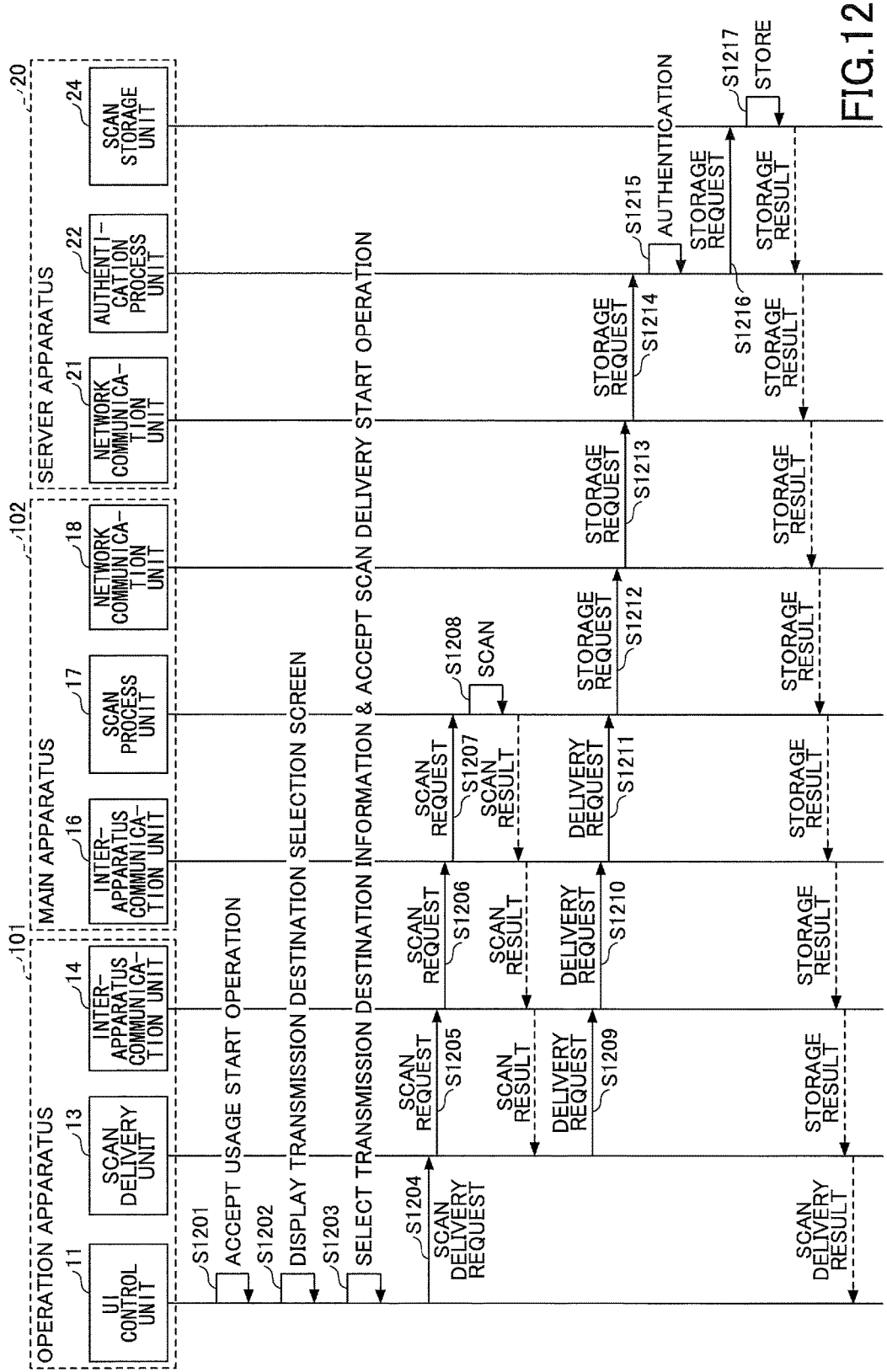
FIG. 12 is a sequence chart illustrating an example overall process relating to scan delivery according to the first embodiment.

In the following, an example case where a user, such as a general user, uses a scan delivery service at the image forming apparatus 10 will be described with reference to FIG. 12. FIG. 12 is a sequence chart illustrating an example overall process relating to scan delivery according to the first embodiment. In the example of FIG. 12, it is assumed that the user is a general user, for example.

First, the user operates the operation apparatus 101 to perform an operation (usage start operation) for staring usage of the scan delivery service. In turn, the UI control unit 11 of the operation apparatus 101 accepts the usage start operation (step S1201).

Upon accepting the usage start operation, the UI control unit 11 displays a transmission destination selection screen for selecting transmission destination information (step S1202). Then, the UI control unit 11 accepts operations on the transmission destination selection screen performed by the user for selecting transmission destination information and starting the scan delivery service (transmission destination information selection operation and scan delivery start operation) (step S1203).

Figure 13:
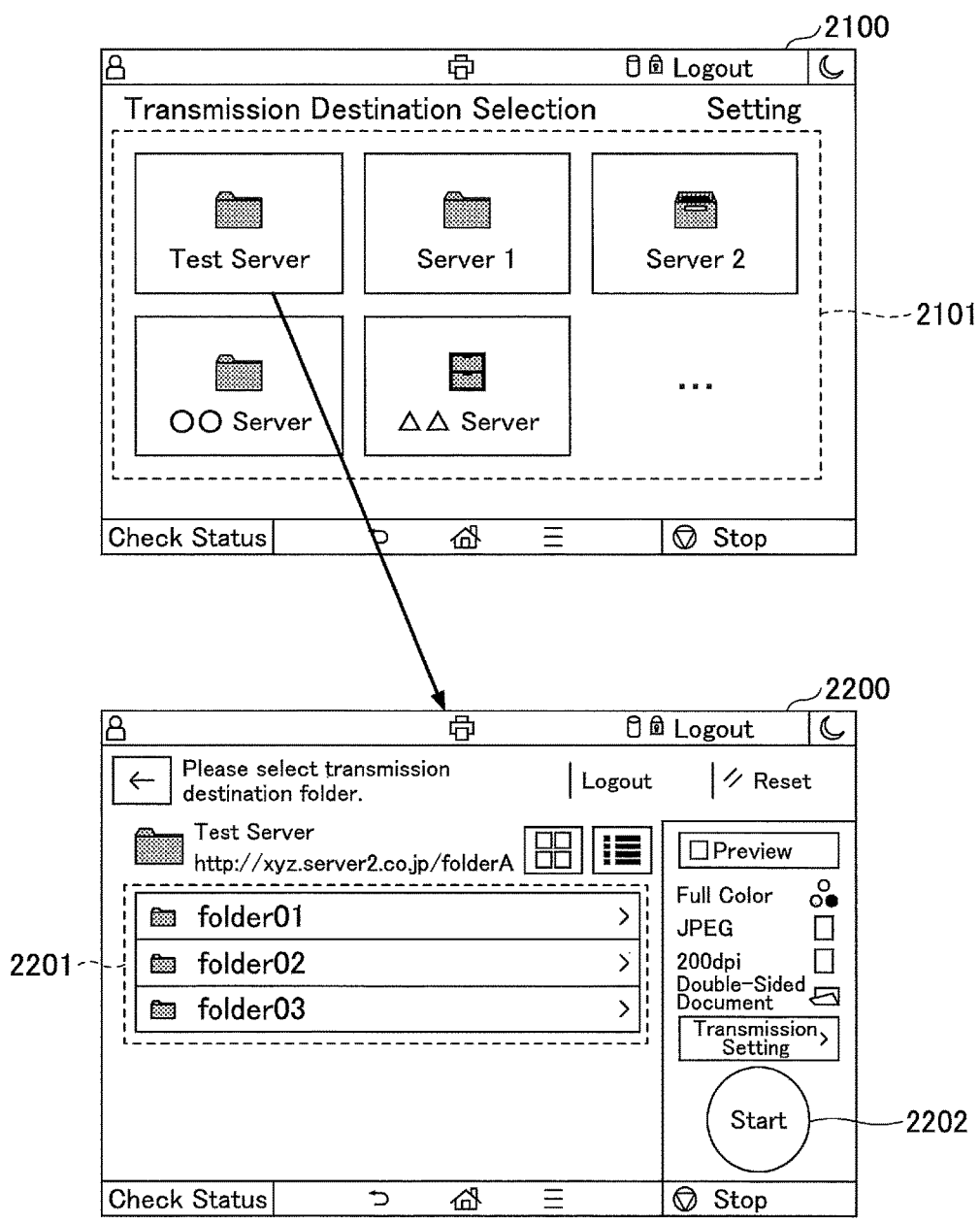
FIG. 13 is a diagram illustrating an example screen transition of a transmission destination selection screen.

In the following, screen transitions of a screen displayed on the operation panel 115 when the user selects transmission destination information and performs a scan delivery start operation will be described with reference to FIG. 13. FIG. 13 is a diagram illustrating an example screen transition of the transmission destination selection screen.

Upon accepting the usage start operation in step S1201, the UI control unit 11 displays a transmission destination selection screen 2100 as illustrated in FIG. 13.

The transmission destination selection screen 2100 of FIG. 13 includes a transmission destination list 2101 for enabling selection of transmission destination information registered in the image forming apparatus 10. Note that the transmission destination list 2101 displays an icon and a server name included in the transmission destination information of each transmission destination registered in the image forming apparatus 10.

When the user selects desired transmission destination information from the transmission destination list 2101, the UI control unit 11 accepts the selection operation. Then, the UI control unit 11 displays a transmission destination selection screen 2200 as illustrated in FIG. 13.

The transmission destination selection screen 2200 of FIG. 13 includes a subfolder selection field 2201 for selecting a subfolder under the root folder included in the transmission destination information selected via the transmission destination selection screen 2100 of FIG. 13. By having the user select a desired folder in the subfolder selection field 2201, image data can be delivered to the subfolder held under the root folder.

In the transmission destination selection screen 2200 of FIG. 13, the user can also set up various settings relating to document scanning (e.g., full color/monochrome, file format, resolution, double side/single side).

When the user presses a button 2202 for starting a scan delivery service, the UI control unit 11 accepts the pressing operation.

Upon receiving the pressing operation of the button 2202 on the transmission destination selection screen 2200 of FIG. 13, the UI control unit 11 transmits a scan delivery service start request (scan delivery request) to the scan delivery unit 13 (step S1204). The scan delivery service start request may include, for example, various items of information (URL, user name, password, etc.) included in the transmission destination information selected by the user and information on the folder (image data storage destination folder) selected by the user via the transmission destination selection screen 2200 of FIG. 13.

Then, upon receiving the scan delivery request from the UI control unit 11, the scan delivery unit 13 of the operation apparatus 101 transmits a scan request to the main apparatus 102 via the inter-apparatus communication unit 14 (steps S1205 and S1206).

Then, upon receiving the scan request from the operation apparatus 101 via the inter-apparatus communication unit 16, the scan process unit 17 of the main apparatus 102 performs a scan process (steps S1207 and S1208). That is, the scan process unit 17 scans a document set to the main apparatus 102 to generate image data of the scanned document. The scan process unit 17 stores the generated image data in a predetermined storage area of the main apparatus 102.

Then, the scan process unit 17 transmits a scan result to the operation apparatus 101 indicating that the scan process has been completed.

Then, upon receiving the scan result, the scan delivery unit 13 transmits a delivery request to the main apparatus 102 via the inter-apparatus communication unit 14 (steps S1209 and S1210). The delivery request is a request for delivering the image data generated by the scan process to the server apparatus 20. The delivery request may include, for example, the URL, the user name, and the password included in the transmission destination information selected by the user, and information on the image data storage destination folder selected by the user, for example.

Then, upon receiving the delivery request from the operation apparatus 101 via the inter-apparatus communication unit 16, the scan process unit 17 acquires the generated image data. Then, the scan process unit 17 transmits an image data storage request to the corresponding server apparatus 20 via the network communication unit 18 (steps S1211 to S1213). That is, the network communication unit 18 transmits a storage request including the image data, the user name, the password, and the like to the server apparatus 20 specified by the URL included in the delivery request received by the inter-apparatus communication unit 16.

Then, upon receiving the storage request from the main apparatus 102 via the network communication unit 21, the authentication process unit 22 of the server apparatus 20 performs an authentication process based on the storage request (steps S1214 and S1215). That is, the authentication process unit 22 determines whether the combination of the user name and the password included in the storage request is stored in the authentication storage unit 25.

When the authentication process unit 22 determines that the combination of the user name and the password is stored in the authentication storage unit 25 (i.e., when the authentication process is successful), the authentication process unit 22 transmits the storage request to the scan storage unit 24 (step S1216).

Then, upon receiving the storage request from the authentication process unit 22, the scan storage unit 24 stores the image data included in the storage request in the scan storage unit 26 (step S1207). In this way, the image data generated by the scan process may be stored in the corresponding server apparatus 20 based on the transmission destination information selected by the user.

Then, the scan storage unit 24 transmits a scan delivery result to the operation apparatus 101 via the main apparatus 102. Note that if the authentication process performed in step S1215 is unsuccessful, the authentication process unit 22 may transmit a scan delivery result indicating authentication failure to the operation apparatus 101.

As described above, in the scan delivery system 1 according to the present embodiment, the user can select desired destination information from the transmission destination information registered in the image forming apparatus 10 so that image data can be transmitted to the server apparatus 20 specified by the selected transmission destination information. Moreover, in the scan delivery system 1 according to the present embodiment, valid transmission destination information is registered in the image forming apparatus 10, and as such, situations where image data transmission fails due to authentication failure at the server apparatus 20 may be prevented, for example.

Note that in the scan delivery system 1 according to the present embodiment, transmission destination information of image data to be used in implementing a scan delivery service is registered in the image forming apparatus 10. However, the present invention is not limited to registering such transmission destination information. For example, in some embodiments, acquisition destination information of image data to be used when the image forming apparatus 10 acquires image data from the server apparatus 20 to print out the acquired image data may be registered. That is, embodiments of the present invention can be applied to various cases of registering connection destination information to be used for exchanging various data (image data, print data, etc.) between the image forming apparatus 10 and the server apparatus 20.

Second Embodiment

In the following, a second embodiment of the present invention will be described. In the second embodiment, transmission destination information is divided into fixed information and variable information that are respectively stored in the operation apparatus 101 and the main apparatus 102. Thus, in the image forming apparatus 10 according to the second embodiment, for example, even when the storage capacity of the operation apparatus 101 is small, a sufficiently large amount of transmission destination information can be registered in the image forming apparatus 10.

Note that in the following description of the second embodiment, elements having substantially the same functions as those of the first embodiment and steps performing substantially the same processes as those of the first embodiment are given the same reference numerals and overlapping descriptions thereof may be omitted.

<Functional Configuration>

Figure 14:
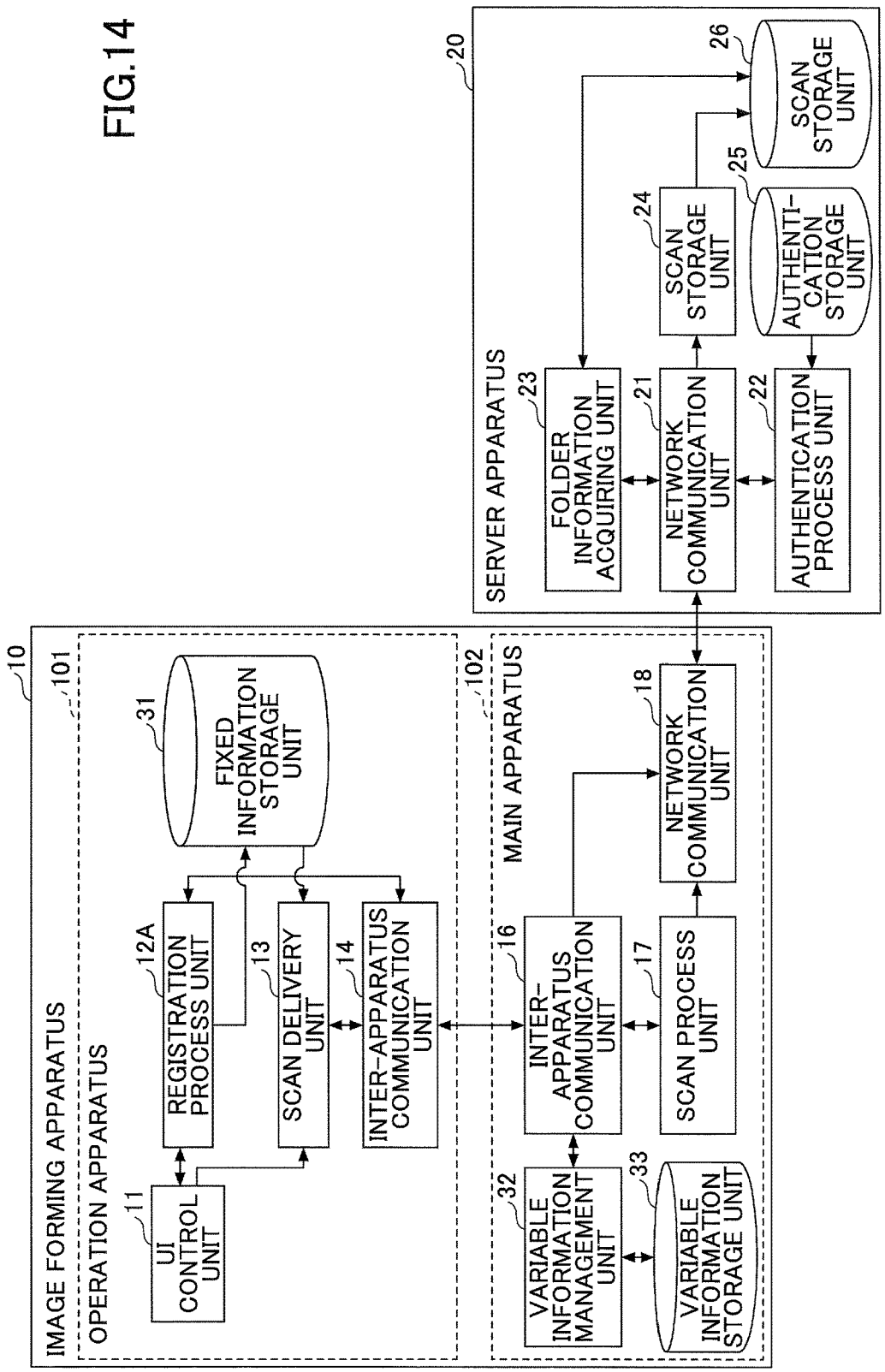
FIG. 14 is a diagram illustrating an example functional configuration of a scan delivery system according to a second embodiment of the present invention.

First, the functional configuration of the scan delivery system 1 according to the second embodiment will be described with reference to FIG. 14. FIG. 14 is a diagram illustrating an example functional configuration of the scan delivery system 1 according to the second embodiment.

In FIG. 14, the operation apparatus 101 of the image forming apparatus 10 includes a registration process unit 12A. Further, the operation apparatus 101 of the image forming apparatus 10 includes a fixed information storage unit 31. The fixed information storage unit 31 can be implemented by the flash memory 114, for example.

The registration process unit 12A generates variable information included in the transmission destination information registered in the image forming apparatus 10 based on the various items of information input via the transmission destination registration screen. In the present embodiment, the transmission destination information is divided into fixed information and variable information.

The fixed information corresponds to items of information to be selected by the user from among various options and input via the transmission destination registration screen. For example, the fixed information may include image data of an icon. On the other hand, variable information corresponds to information that can be arbitrarily input by the user via the transmission destination registration screen. For example, the variable information may include a URL, a user name, a password, a server name, and the like.

The fixed information storage unit 31 stores fixed information to be selected by the user. In the following, fixed information stored in the fixed information storage unit 31 will be described with reference to FIG. 15. FIG. 15 is a diagram illustrating an example of fixed information.

In FIG. 15, the fixed information stored in the fixed information storage unit 31 includes information items "icon ID" and "icon".

The "icon ID" is identification information identifying an icon. The "icon" is image data of an icon (display component) to be displayed when a user, such as a general user, is to select transmission destination information. In this way, the fixed information stores an icon ID and an icon in association with each other. As described below, by storing such fixed information, the variable information does not have to store an icon (image data) for each set of transmission destination information.

Note that in the fixed information according to the present embodiment, an icon ID and an icon are associated with each other. However, the present invention is not limited thereto. For example, when the transmission destination information includes setting values of various settings relating to the scan process, the fixed information may include the setting values of the various settings (full color/monochrome, file format, resolution, two-sides/one side, etc.) and corresponding setting ID numbers associated with each other.

Also, in FIG. 14, the main apparatus 102 of the image forming apparatus 10 includes a variable information management unit 32, which may be implemented by the CPU 121 executing a process based on one or more programs included in the main apparatus 102, for example.

Further, the main apparatus 102 of the image forming apparatus 10 includes a variable information storage unit 33, which may be implemented by the HDD 124, for example.

The variable information management unit 32 manages the variable information stored in the variable information storage unit 33. That is, the variable information management unit 32 stores the variable information in the variable information storage unit 33 and also acquires the variable information from the variable information storage unit 33.

The variable information storage unit 33 stores variable information. In the following, the variable information stored in the variable information storage unit 33 is described with reference to FIG. 16. FIG. 16 is a diagram illustrating an example of the variable information.

In FIG. 16, the variable information stored in the variable information storage unit 33 includes information items, such as "URL", "user name", "password", "server name", "root folder", and "icon ID". Note that the information items "URL", "user name", "password", "server name", and "root folder" may be the same as those illustrated in FIG. 6.

The "icon ID" is identification information identifying an icon. That is, the variable information includes referential information (icon ID) to be used to refer to the fixed information stored in the fixed information storage unit 31. Thus, for example, when a common icon is used among a plurality of sets of variable information, the same icon ID may be associated with each of the plurality of sets of variable information. That is, in contrast to the transmission destination information according to the first embodiment, in the transmission destination information according to the second embodiment, image data of an icon does not have to be stored for each set of transmission destination information.

<Process Operations>

In the following, process operations of the scan delivery system 1 according to the second embodiment will be described.

Figure 17:
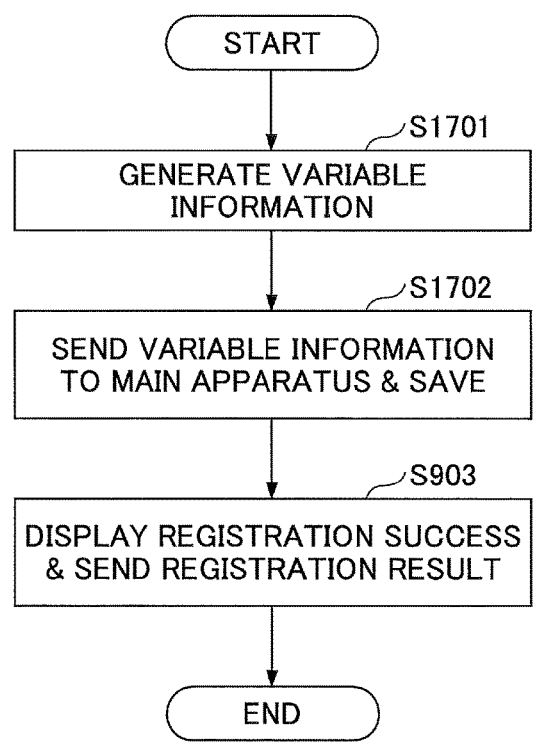
FIG. 17 is a flowchart illustrating an example process of generating and registering transmission destination information according to the second embodiment.

The descriptions below relate to the process of generating and registering transmission destination information according to the second embodiment (corresponding to the process of step S725 in FIG. 7). FIG. 17 is a flowchart showing an example process of generating and registering transmission destination information according to the second embodiment. In the second embodiment, variable information is generated to generate transmission destination information. Note that step S903 of FIG. 17 is substantially the same as step S903 of FIG. 9, and as such, a description thereof will be omitted.

First, the registration process unit 12A generates variable information based on various items of information (URL, user name, password, server name, root folder, icon, etc.) included in the transmission destination information registration request (step S1701).

That is, the registration process unit 12A generates variable information including referential information to be used to refer to fixed information. Specifically, for example, the registration process unit 12A may acquire from the fixed information an icon ID identifying the icon included in the transmission destination information registration request. Then, the registration process unit 12A generates variable information including the URL, the user name, the password, the server name, and the root folder included in the transmission destination information registration request, and the icon ID acquired from the fixed information.

Then, the registration process unit 12A transmits the variable information generated in step S1701 to the main apparatus 102. Then, the variable information management unit 32 of the main apparatus 102 stores the variable information in the variable information storage unit 33 (step S1702). In this way, the transmission destination information may be registered in the image forming apparatus 10.

As described above, in the scan delivery system 1 according to the second embodiment, transmission destination information is divided into fixed information and variable information that are respectively stored in the operation apparatus 101 and the main apparatus 102. Also, in the scan delivery system 1 according to the second embodiment, variable information is generated in response to a transmission destination information registration operation made by a user such as an administrator, and the variable information is stored in the main apparatus 102.

In this way, in the scan delivery system 1 according to the second embodiment, for example, even when the storage capacity of the operation apparatus 101 is small, a sufficiently large amount of transmission destination information may be registered in the image forming apparatus 10, and by having the main apparatus 102 store variable information, transmission destination information may be efficiently stored.

Although the present invention has been described above with reference to certain illustrative embodiments, the present invention is not limited to these embodiments, and numerous variations and modifications may be made without departing from the scope of the present invention.

What is claimed is:

1. An image forming apparatus comprising:
    a scanner;
    a memory storing a program; and
    a circuitry configured to execute the program to implement processes of
        accepting an input of server information to be registered in the image forming apparatus for establishing connection between the image forming apparatus and a server apparatus via a network;
        determining whether the accepted server information is valid in advance of registering connection destination information including the server information in the image forming apparatus; and
        registering the connection destination information in the image forming apparatus; and
        transmitting image data scanned by the scanner to the server apparatus using the registered connection destination information,
        wherein the determining is performed after the server information is input and after an operation for a screen transition of an operation panel of the image forming apparatus is performed.

2. The image forming apparatus according to claim 1, wherein
    the circuitry determines whether the accepted server information is valid based on address information included in the accepted server information; and the circuitry determines that the accepted server information is invalid when the server apparatus specified by the address information included in the accepted server information does not exist.

3. The image forming apparatus according to claim 1, wherein
the circuitry requests the server apparatus specified by address information included in the accepted server information to perform an authentication process using authentication information included in the accepted server information; and
the circuitry determines that the accepted server information is valid when the authentication process results in successful authentication of the authentication information.

4. The image forming apparatus according to claim 3, wherein the circuitry further implements processes of
acquiring folder information indicating a hierarchy of folders in the server apparatus upon determining that the accepted server information is valid;
displaying a folder selection field based on the acquired folder information; and
generating the connection destination information that includes the accepted server information and information relating to a selected folder selected by a user via the displayed folder selection field.

5. The image forming apparatus according to claim 3, wherein
the circuitry determines that the accepted server information is valid before registering the connection destination information in the image forming apparatus.

6. The image forming apparatus according to claim 1, further comprising:
an operation apparatus that is operated by a user; and
a main apparatus having the image processing function;
wherein the circuitry accepts the server information that has be generated by the user using the operation apparatus.

7. The image forming apparatus according to claim 6, wherein
the connection destination information includes variable information including the server information and fixed information including predetermined information stored in a first storage unit of the operation apparatus, the fixed information being referenced based on the variable information.

8. The image forming apparatus according to claim 6, wherein
when the circuitry determines that the accepted server information is invalid, the processor causes the operation apparatus to display a screen indicating that the accepted server information is invalid.

9. The image forming apparatus according to claim 6, wherein
when the circuitry determines that the accepted server information is invalid, the processor causes the operation apparatus to display a screen for editing the server information.

10. The image forming apparatus according to claim 1, wherein
the image processing function includes a scan function; and
the circuitry transmits image data of a scanned document generated by the scan function to the server apparatus using the registered connection destination information.

11. The image forming apparatus according to claim 1, wherein the connection information includes both fixed information including a server icon image and variable information including a server address.

12. The image forming apparatus according to claim 1, wherein the circuitry is configured to execute the program to implement processes of:
displaying a screen for a list of destination folders of scanned image indicated by the server information upon performing the screen transition,
wherein the determining is performed after the server information is input but before the screen transition to the list of destination folders of the scanned image is completed.

13. The image forming apparatus according to claim 1, wherein the determining is performed after the server information is input and before finishing of user operation of registering the connection destination information including the server information in the image forming apparatus.

14. The image forming apparatus according to claim 1, wherein the screen transition is a transition from a screen to input the server information to a next screen, and is performed by a user for registering the connection destination information including the server information in the image forming apparatus.

15. An information processing system including a information processing apparatus operated by a user and an image forming apparatus having an image processing function, the image forming apparatus comprising:
a scanner;
a memory storing a program; and
a circuitry configured to execute the program to implement processes of
accepting an input of server information to be registered in the image forming apparatus for establishing connection between the image forming apparatus and a server apparatus via a network;
determining whether the accepted server information is valid in advance of registering connection destination information including the server information in the image forming apparatus; and
registering the connection destination information in the image forming apparatus; and
transmitting image data scanned by the scanner to the server apparatus using the registered connection destination information,
wherein the determining is performed after the server information is input and after an operation for a screen transition of an operation panel of the image forming apparatus is performed.

16. An image forming method that is implemented by an image forming apparatus having a scanner and an image processing function, the information processing method comprising:
accepting an input of server information to be registered in the image forming apparatus for establishing connection between the image forming apparatus and a server apparatus via a network;
determining whether the accepted server information is valid in advance of registering connection destination information including the server information in the image forming apparatus; and
registering the connection destination information in the image forming apparatus; and
transmitting image data scanned by the scanner to the server apparatus using the registered connection destination information, wherein the determining is performed after the server information is input and after an operation for a screen transition of an operation panel of the image forming apparatus is performed.

* * * * *